US011658897B2

(12) United States Patent
Dhamal Gopalarathnam et al.

(10) Patent No.: US 11,658,897 B2
(45) Date of Patent: May 23, 2023

(54) LOOP PREVENTION SYSTEM

(71) Applicant: Dell Products L.P., Round Rock, TX (US)

(72) Inventors: Sudharsan Dhamal Gopalarathnam, Bothell, WA (US); Senthil Kumar Ganesan, San Ramon, CA (US)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 17/365,326

(22) Filed: Jul. 1, 2021

(65) Prior Publication Data

US 2023/0006916 A1    Jan. 5, 2023

(51) Int. Cl.
*H04L 45/18* (2022.01)
*H04L 12/46* (2006.01)
*H04L 41/0654* (2022.01)

(52) U.S. Cl.
CPC .......... *H04L 45/18* (2013.01); *H04L 12/4641* (2013.01); *H04L 41/0654* (2013.01)

(58) Field of Classification Search
None
See application file for complete search history.

(56) References Cited

U.S. PATENT DOCUMENTS

| | | | |
|---|---|---|---|
| 9,325,490 B2* | 4/2016 | Tiwari | H04L 7/0331 |
| 2002/0176371 A1* | 11/2002 | Behzadi | H04L 45/18 370/254 |
| 2006/0133286 A1* | 6/2006 | Elie-Dit-Cosaque | H04L 45/00 370/389 |
| 2009/0109972 A1* | 4/2009 | Chen | H04L 45/16 370/392 |
| 2014/0122741 A1* | 5/2014 | Thubert | H04L 45/46 709/239 |
| 2014/0204768 A1* | 7/2014 | Chen | H04L 43/10 370/244 |
| 2019/0042484 A1* | 2/2019 | Fornal | G06F 13/102 |
| 2019/0253208 A1* | 8/2019 | Grosser | H04L 43/10 |
| 2022/0060415 A1* | 2/2022 | Dutta | H04L 41/12 |

* cited by examiner

*Primary Examiner* — Lonnie V Sweet
(74) *Attorney, Agent, or Firm* — Joseph Mencher

(57) ABSTRACT

A loop prevention system includes a plurality of networking devices that are coupled together to form a Layer Two (L2) domain and at least a portion of the plurality of networking devices are coupled together in a physical loop configuration. A networking device included in the plurality of networking devices may include at least one L2 domain connection that couples the networking device to at least one of the plurality of networking devices in the L2 domain, and an edge connection that connects the networking device to a computing device that is outside of the L2 domain. The networking device may receive a data frame via the edge connection. The networking device then generates a loop breaker data frame by tagging the data frame with a loop breaker tag and forwards the loop breaker data frame via the at least one L2 domain connection.

20 Claims, 23 Drawing Sheets

LOOP PREVENTION SYSTEM

BACKGROUND

The present disclosure relates generally to information handling systems, and more particularly to preventing network failures caused by logical loops in information handling systems that are provided in a physical loop configuration.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems provide networking nodes (e.g., switches, routers, gateways, and/or other networking devices) that may be configured in various topologies to form a layer-2 domain, and those various topologies may result in some or all of the networking nodes in the layer-2 domain forming one or more physical loops that can cause issues with the network. For example, while physical loops may provide benefits such as redundancy, layer-2 logical loops resulting from those physical loops can consume the majority of network resources due to, for example, the rebroadcasting of network traffic between the networking nodes in the physical loop configuration. The Spanning Tree Protocol (STP) is a layer-2 protocol that is often used to prevent network traffic from looping on networking nodes in a physical loop configuration. However, when STP on even one of the networking nodes malfunctions, a logical loop may result that causes frame flooding in the entire topology, which can lead to scenarios where the entire layer-2 domain becomes non-functional.

For example, the STP may fail or be temporarily ineffective for various reasons such as software issues that result from programming the STP state improperly, interop issues that may occur when a new networking node is brought into the layer-2 domain with a different default STP protocol, hardware issues such as a hardware freeze in which the STP opens but the data plane is not disturbed, topology changes that may introduce intermittent loops that only settle once STP converges (with the frame flooding affecting the performance of the networking nodes during the time the STP takes to converge), and/or other STP issues known in the art. As such, logical loops like those discussed above may not only bring down a cluster of networking nodes and the applications they provide, but may also bring down the network as well.

Accordingly, it would be desirable to provide an improved loop prevention system.

SUMMARY

According to one embodiment, Information Handling System (IHS) includes a processing system; and a memory system coupled to the processing system and including instructions that, when executed by the processing system, cause the processing system to provide a loop prevention engine that is configured to: receive, via an edge link that is connected to a computing device that is outside of a first Layer Two (L2) domain, a first data frame; generate a first loop breaker data frame by tagging the first data frame with a first loop breaker tag; and forward, via at least one L2 domain link that is coupled to one or more of a plurality of networking devices that are coupled together to form the L2 domain and that are linked together in a loop configuration, the first loop breaker data frame.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
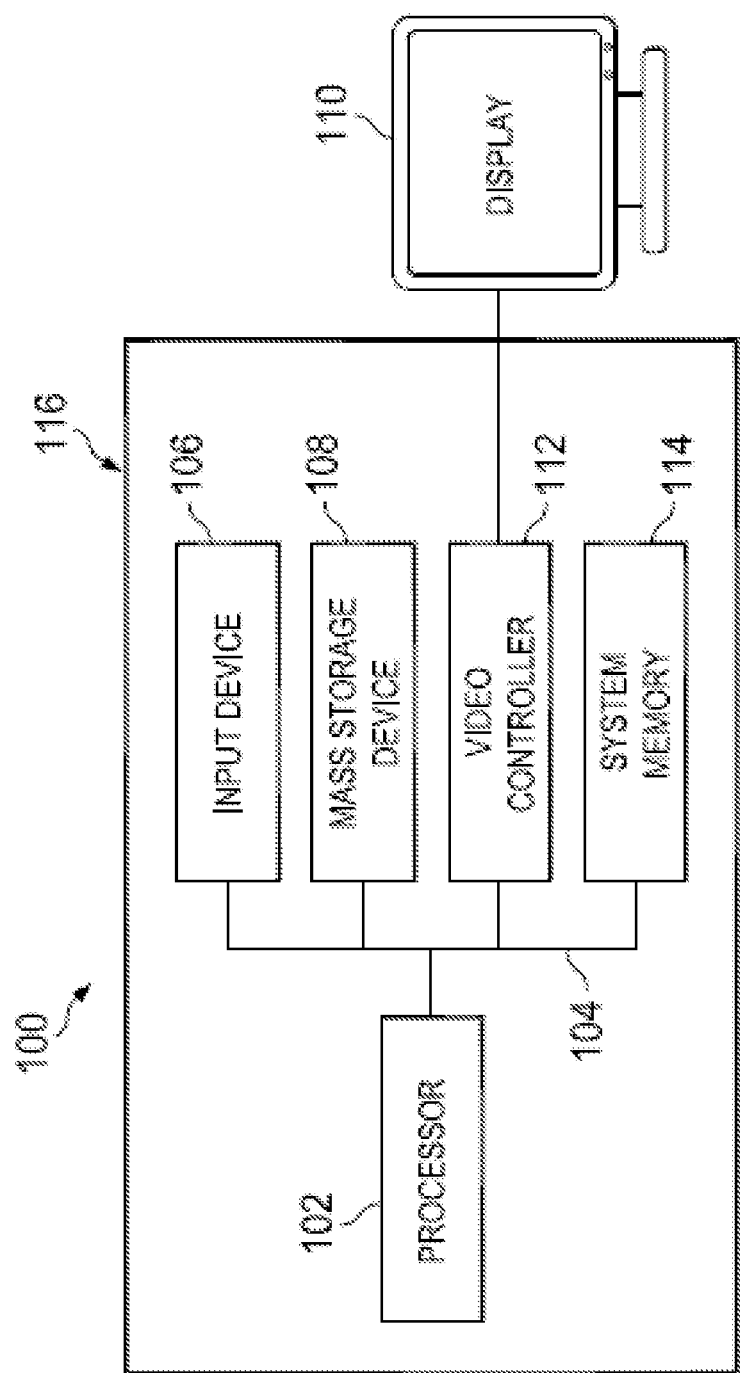
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
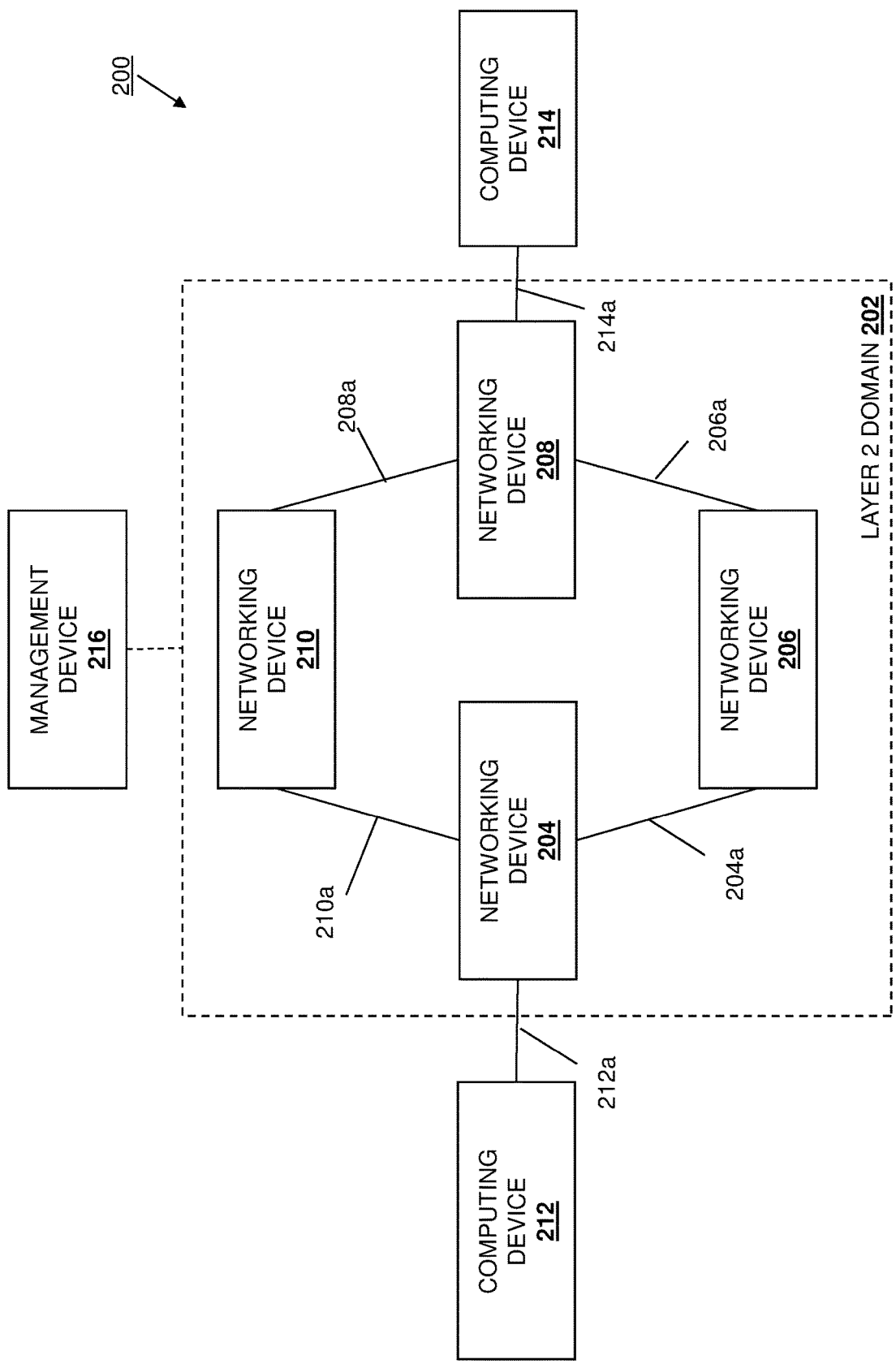
FIG. 2A is a schematic view illustrating an embodiment of a loop prevention system.

Referring now to FIG. 2A, an embodiment of a loop prevention system 200 is illustrated. In the illustrated embodiment, the loop prevention system 200 includes a Layer-Two (L2) domain 202. The L2 domain may include a plurality of networking devices 204, 206, 208, and up to 210. In an embodiment, any or all of the networking devices 204-210 may be provided by the IHS 100 discussed above with reference to FIG. 1 and/or include some or all of the components of the IHS 100, and in specific examples may include switches, routers, access points, gateways, and/or other networking devices that are configured to receive and forward data traffic. In the illustrated embodiment, the networking device 204 is connected to the networking device 206 by an L2 domain connection 204a, the networking device 206 is connected to the networking device 208 by an L2 domain connection 206a, the networking device 208 is connected to the networking device 210 by an L2 domain connection 208a, and the networking device 210 is connected to the networking device 204 by an L2 domain connection 210a.

In specific examples, the L2 domain connections 204a, 206a, 208a, and 210a may be provided by a variety of networking cables (e.g., Ethernet or other communications cables), wireless network connections provided by wireless communications devices, and/or other network connections known in the art. As will be appreciated by one of skill in the art in possession of the present disclosure, the networking devices 204-210 and the L2 domain connections 204a-210a in the example illustrated herein provide a physical loop topology, and while only a few L2 domain connections between the networking devices 204-210 have been provided for clarity of illustration and discussion, many more L2 domain connections may (and typically will) be provided between the networking devices 204-210, and any number of networking devices may be included in the L2 domain 202 while remaining within the scope of the present disclosure. For example, and as illustrated in FIG. 2B, the L2 domain 202 may include a networking device 218 that is coupled to the networking device 204 via an L2 domain connection 218a, and that is not included in the physical loop topology formed by networking devices 204-210 and their L2 domain connections 204a-210a.

In the embodiment illustrated in FIG. 2A, the networking device 204 is coupled to a computing device 212 via an edge connection 212a, and the networking device 208 is coupled to a computing device 214 via an edge connection 214a. in an embodiment, either or each of the computing devices 212 and 214 may be provided by the IHS 100 discussed above with reference to FIG. 1 and/or include some or all of the components of the IHS 100, and in specific examples may include server devices, storage devices, networking devices, desktop computing devices, mobile computing devices, and/or any of a variety of other computing devices that may be configured to direct, transmit, or otherwise provide traffic via the L2 domain 202. In some embodiments, the computing devices 212 may be included in other L2 domains (i.e., other than the L2 domain 202), may be provided by a router that is included in the L2 domain 202, or, as discussed in further detail below, may be considered a device that is outside of the L2 domain 202. In various embodiments, the edge connections 212a and 214a may be provided by a variety of networking cables (e.g., Ethernet or other communications cables), wireless network connections provided by wireless communications devices, and/or other network connections known in the art. As will be appreciated by one of skill in the art in possession of the present disclosure, the embodiment illustrated in FIG. 2B provides the networking device 218 connected to the computing device 212 via the edge connection 212a rather than the networking device 204 connected to a computing device 212 via the edge connection 212a.

Figure 2B:
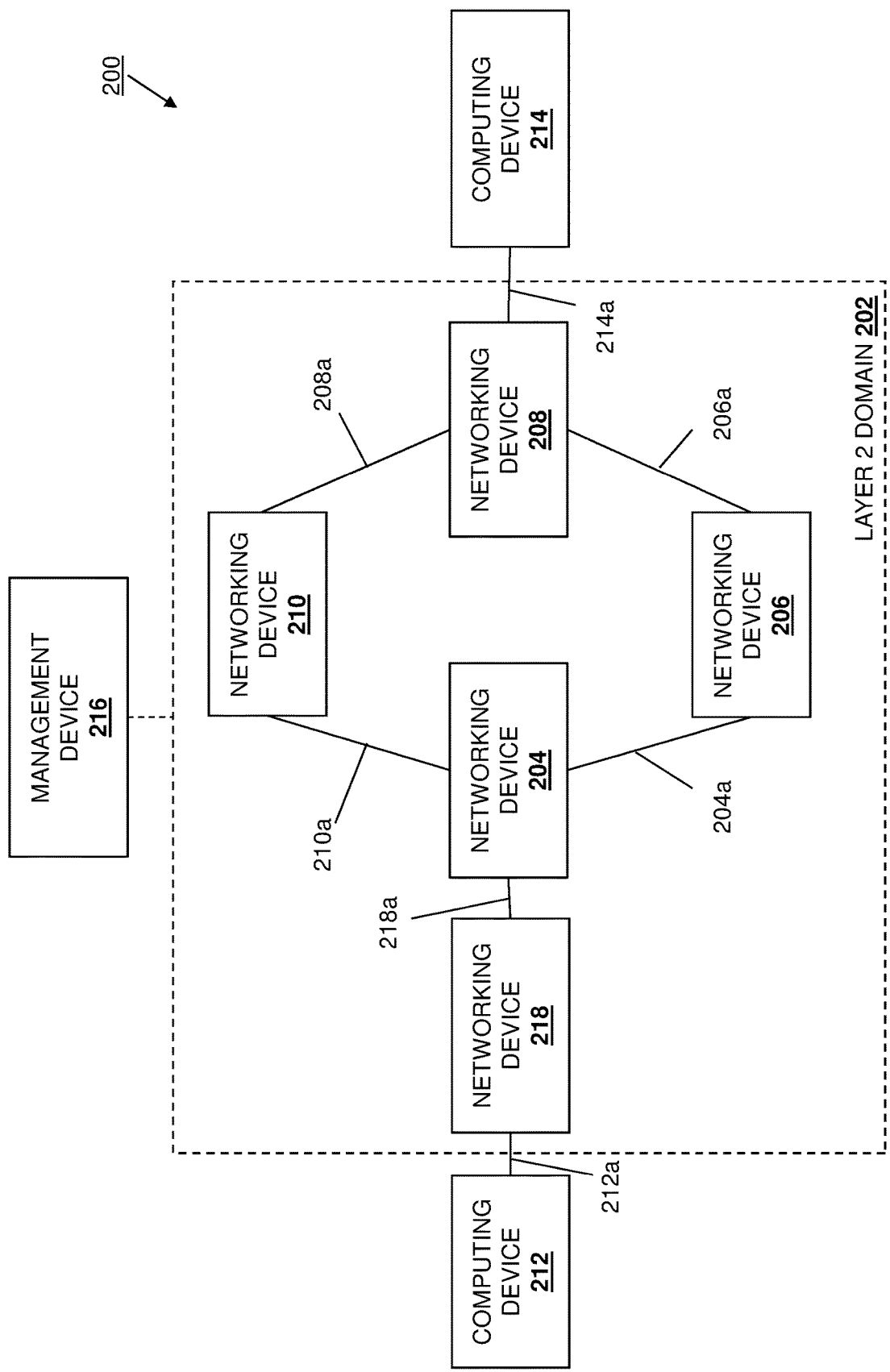
FIG. 2B is a schematic view illustrating an embodiment of a loop prevention system.

In the embodiments illustrated in FIGS. 2A and 2B, the loop prevention system 200 also includes a management device 216. In an embodiment, the management device 216 may be provided by the IHS 100 discussed above with reference to FIG. 1, and/or may include some or all of the components of the IHS 100, and in specific examples may be provided by one or more server devices that operate as part of a network management system for the networking devices 204-210 and/or 218 in the L2 domain 202. However, while illustrated and discussed as being provided by one or more server devices that operate as part of a network management system, one of skill in the art in possession of the present disclosure will recognize that management devices provided in the loop prevention system 200 may include any devices that may be configured to operate similarly as the management device 216 discussed below. Furthermore, while specific examples of the loop prevention system 200 are illustrated and described herein, one of skill in the art in possession of the present disclosure will recognize that a variety of modifications to the devices, device configuration, and/or other aspects of the loop prevention system 200 will fall within the scope of the present disclosure.

Figure 3:
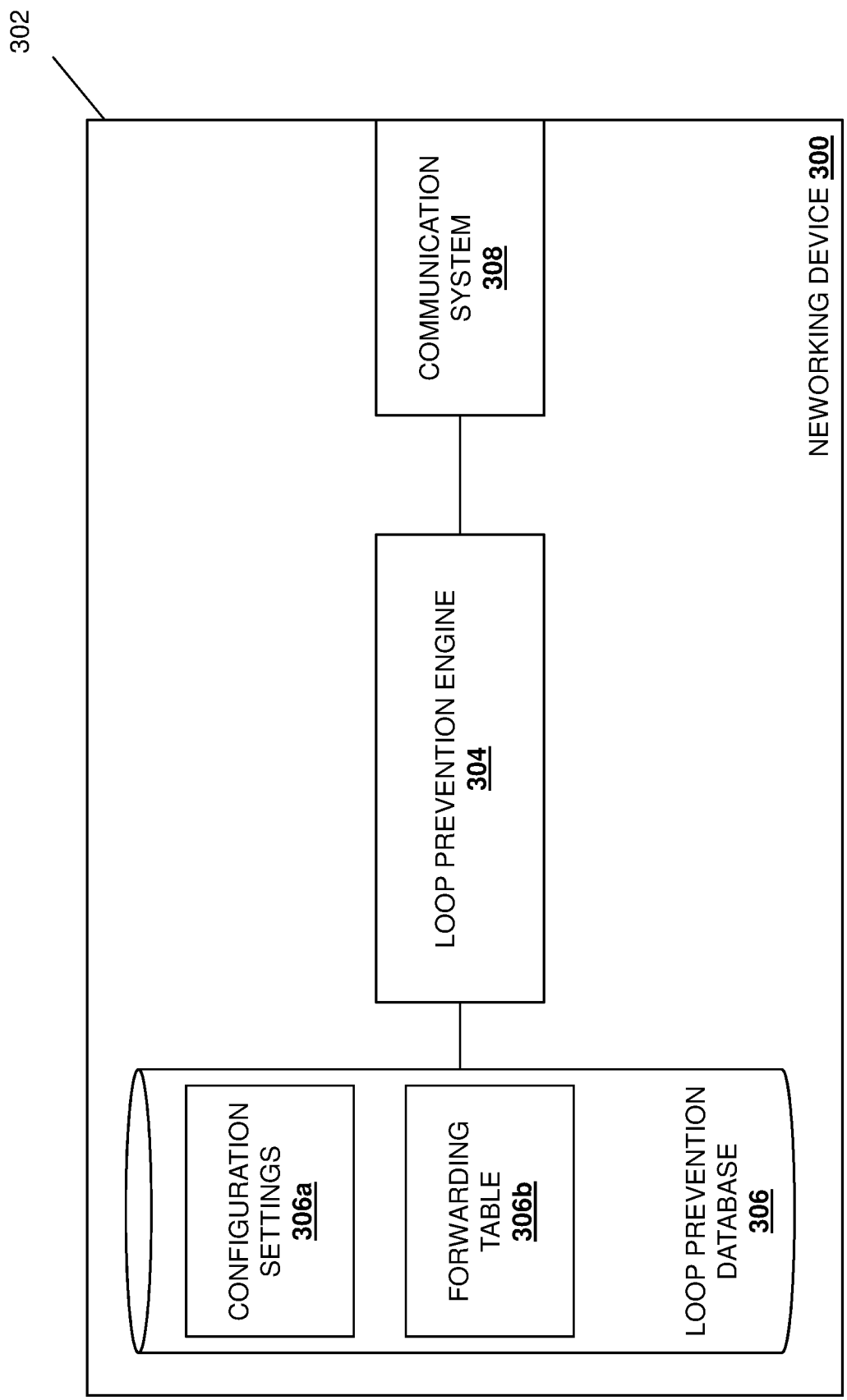
FIG. 3 is a schematic view illustrating an embodiment of a networking device that may be included in the loop prevention system of FIGS. 2A and 2B.

Referring now to FIG. 3, an embodiment of a networking device 300 is illustrated that may be any or each of the networking devices 204, 206, 208, 210, and/or 218 discussed above with reference to FIGS. 2A and 2B. As such, the networking device 300 may be the IHS 100 discussed above with reference to FIG. 1 and/or include some or all of the components of the IHS 100, and in specific examples may be provided by switches, routers, access points, gateways, and/or other networking devices that are configured to receive and forward data traffic. The networking device 300 includes a chassis 302 that houses the components of the networking device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a loop prevention engine 304 that is configured to perform the functions of the loop prevention engines and the networking node devices discussed below.

The chassis 302 also houses a storage system (not illustrated, but which may include the storage device 108 discussed above with reference to FIG. 1) that is coupled to the loop prevention engine 304 (e.g., via a coupling between the storage system and the processing system) and that includes a loop prevention database 306 that may store any of the information utilized by the loop prevention engine 304 discussed below. For example, and as discussed below, the loop prevention engine 304 may generate, receive/retrieve (e.g., through the communication system 308), determine, and/or otherwise identify a configuration setting 306a and/or a forwarding table 306b and store the configuration setting 306a and the forwarding table 306b in the loop prevention database 306. The chassis 302 may also house a communication system 308 that is coupled to the loop prevention engine 304 (e.g., via a coupling between the communication system 308 and the processing system) and that may include a Network Interface Controller (NIC), a wireless communication subsystem (e.g., a WiFi subsystem, a Bluetooth subsystem, a cellular subsystem, etc.), and/or a variety of other communication system components known in the art. Furthermore, the communication system 308 may provide any of a management connection with the management device 216, the L2 domain connections 204a, 206a, 208a, 210a, and/or 218a, and/or the edge connections 212a and/or 214a discussed above with reference to FIGS. 2A and 2B. However, while a specific networking device 300 has been illustrated and described, one of skill in the art in possession of the present disclosure will recognize that networking devices may include a variety of components other than those described above that provide for the performance of conventional networking device functionality, as well as the functionality discussed below, while remaining within the scope of the present disclosure.

Figure 4A:
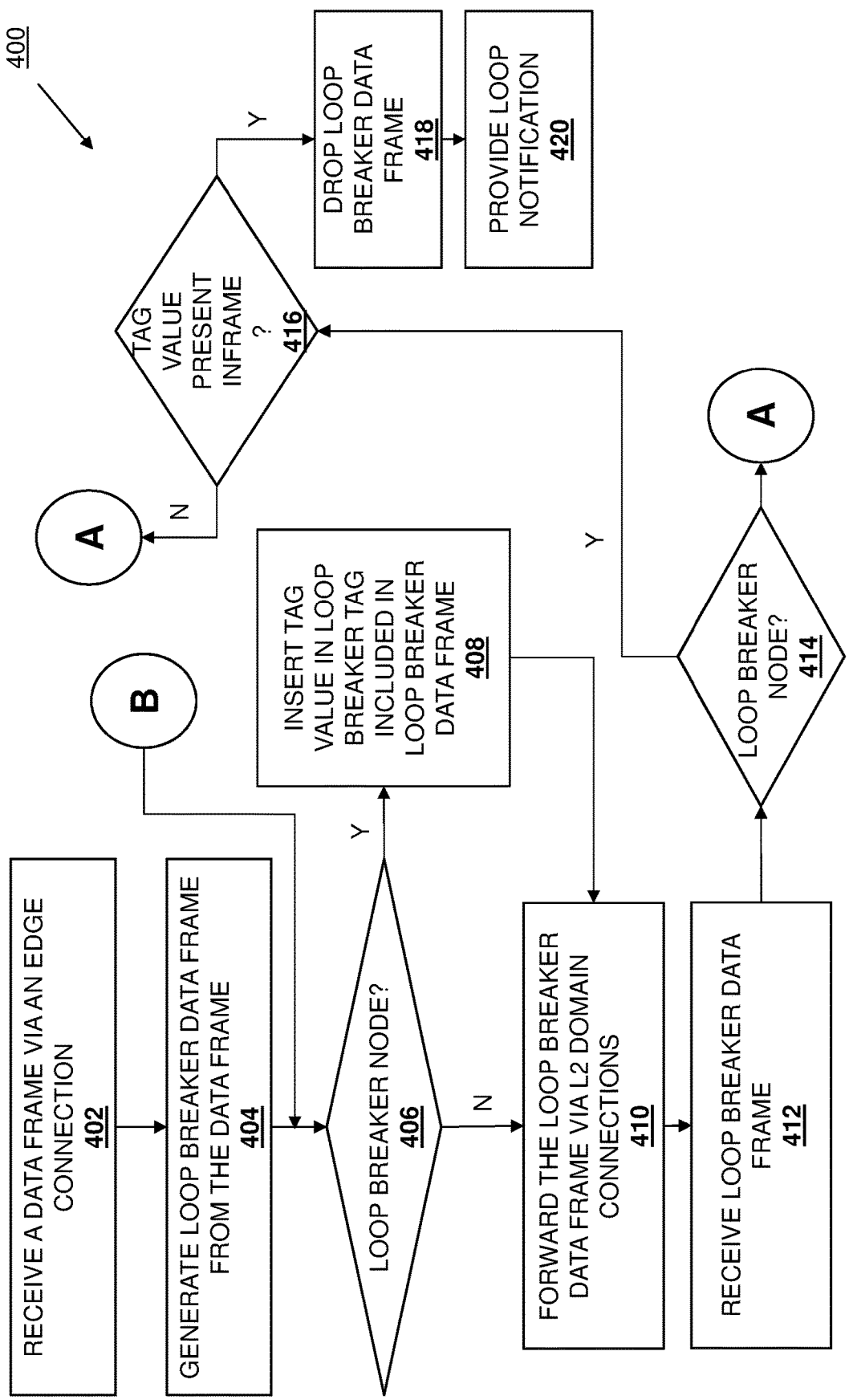
FIGS. 4A and 4B are flow charts illustrating an embodiment of a method of preventing loops.
Figure 4B:
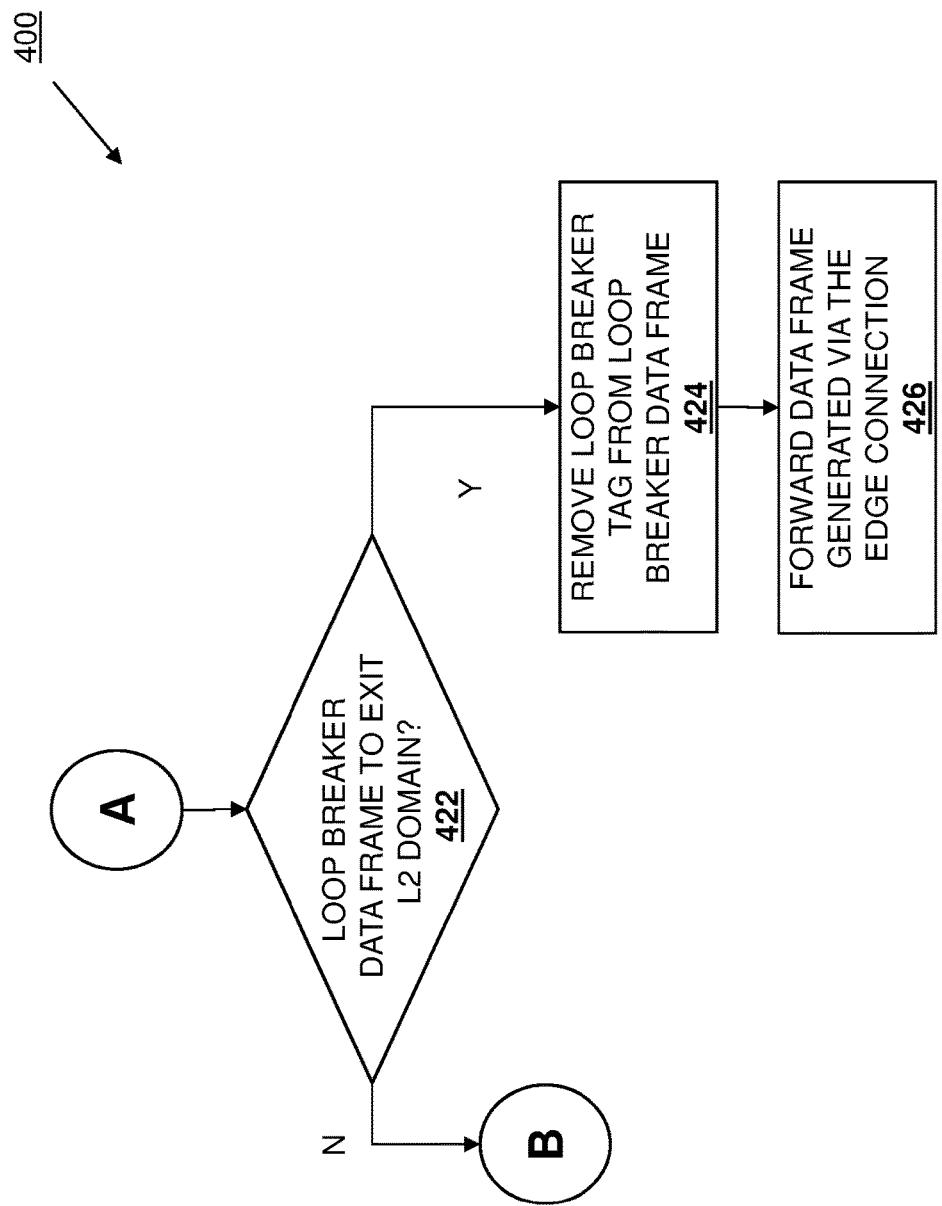

Referring now to FIGS. 4A and 4B, an embodiment of a method 400 for preventing loops is illustrated. As discussed above, networking devices may be provided in a physical loop configuration via, for example, network connections between the networking devices that provide redundancy if one of the network connections is to fail. However, L2 logical loops may occur in such physical loop configurations and can result in the continuous provisioning of the same network traffic to each networking device, thus clogging or otherwise wasting the network bandwidth. Conventional loop prevention systems utilize protocols such as the Spanning Tree Protocol (STP) that prevent such L2 loops, but the STP may fail due to software issues, hardware issues, and/or interop issues with one or more of the networking devices included in an L2 domain, and/or the STP may take some time to converge while data frame flooding of the networking devices in the L2 domain reduces performance of the networking devices until the STP converges.

The loop prevention system of the present disclosure addresses the issues discussed above by designating at least one of the networking devices as a loop breaker node that tags L2 data frames with a unique identifier. As such, if networking devices designated as loop breaker nodes receive an L2 data frame with their unique identifier, those networking devices may drop that data frame and then notify a network administrator that a logical loop is present on the loop prevention system. In some embodiments, a loop prevention tag may be attached to L2 data frames as those L2 data frames enter the L2 domain on edge connections, the networking devices that are designated as loop breaker nodes may express their unique identifier by marking a respective bit in that loop prevention tag before providing the L2 data frame to other networking devices in the L2 domain, and when the L2 data frame that includes the loop prevention tag leaves the L2 domain via an edge connection, the networking device that is egressing that L2 data frame via an edge connection may remove the loop prevention tag. As such, while a logical loop may exist in the L2 domain due to issues with STP, the systems and methods of the present disclosure will prevent the entire cluster of networking devices and applications from going down by dropping frames that are in the logical loop until those issues with the STP have been corrected.

Figure 5A:
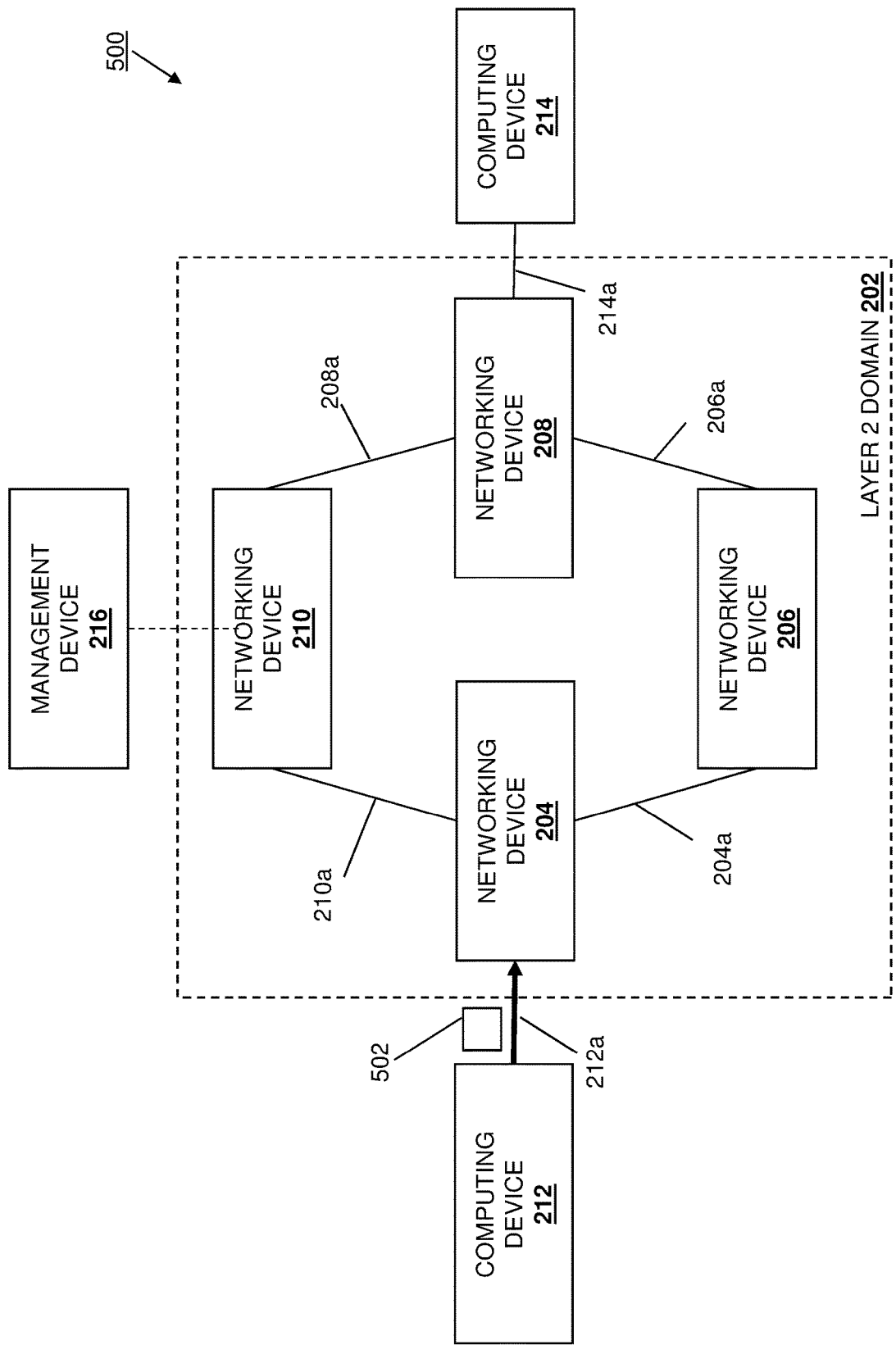
FIGS. 5A-5F are schematic views illustrating an embodiment of the loop prevention system of FIG. 2A operating during the method of FIGS. 4A and 4B.
Figure 7A:
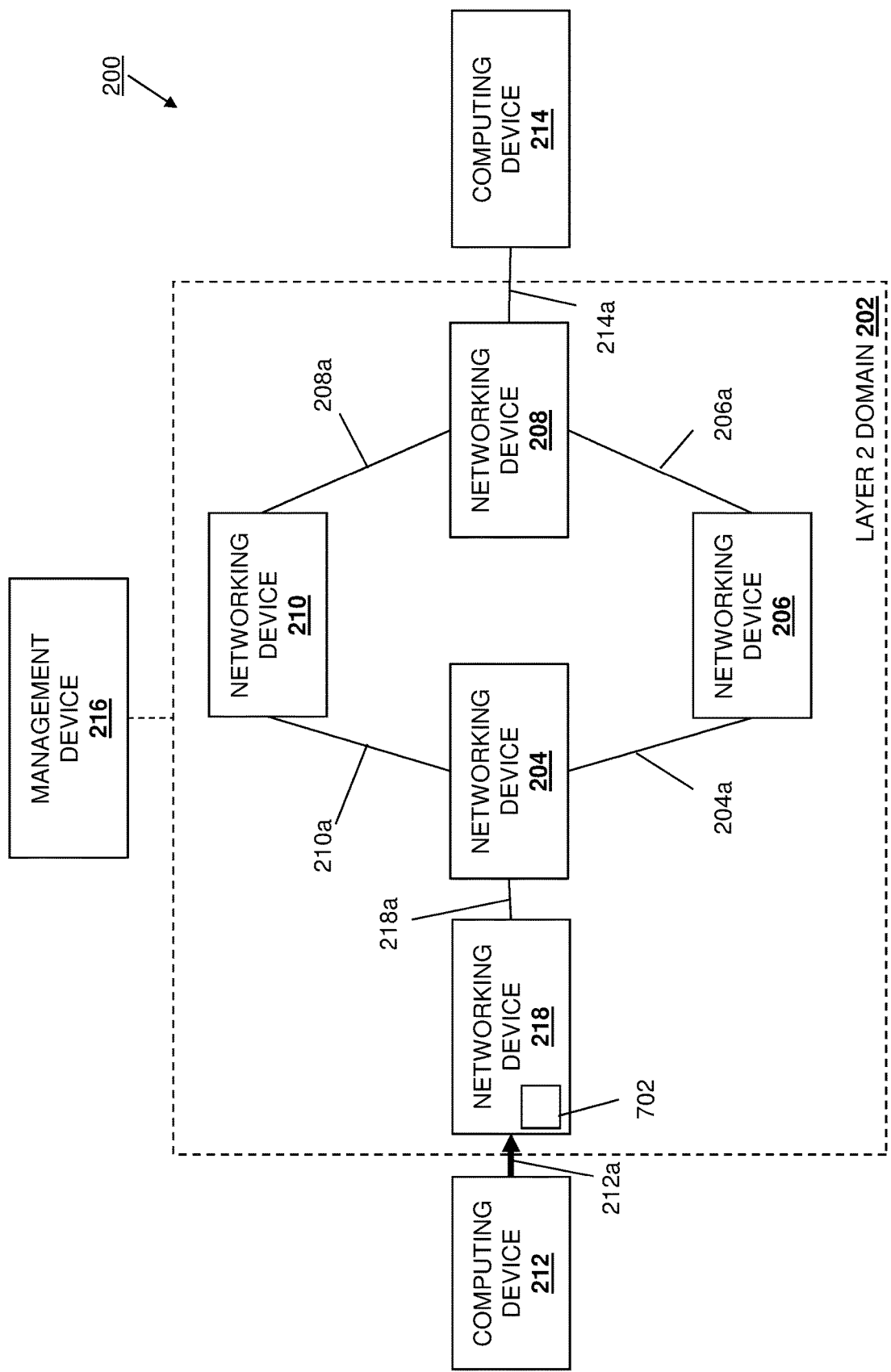
FIGS. 7A-7F are schematic views illustrating an embodiment of the loop prevention system of FIG. 2B operating during the method of FIGS. 4A and 4B.

The method 400 begins at block 402 where a networking device in an L2 domain receives a first data frame via an edge connection. In an embodiment, at block 402, a first data frame may enter the L2 domain 202. For example, and with reference to FIG. 5A, the networking device 204 may receive a data frame 502 via the edge connection 212a (as illustrated by the bolded arrow on network connection 212a in FIG. 5A). In another example, and with reference to FIG. 7A, the networking device 218 may receive a data frame 702 via the edge connection 212a (as illustrated by the bolded arrow on network connection 212a in Fi. 7A). In a specific example, the data frame 502/702 may be provided by an Ethernet frame according to the IEEE 802.1Q frame format, which one of skill in the art in possession of the present disclosure will recognize may include a tagged frame having a Virtual Local Area Network (VLAN) tag (e.g., a 4-byte VLAN tag), or an untagged frame that does not include a VLAN tag.

Figure 8A:
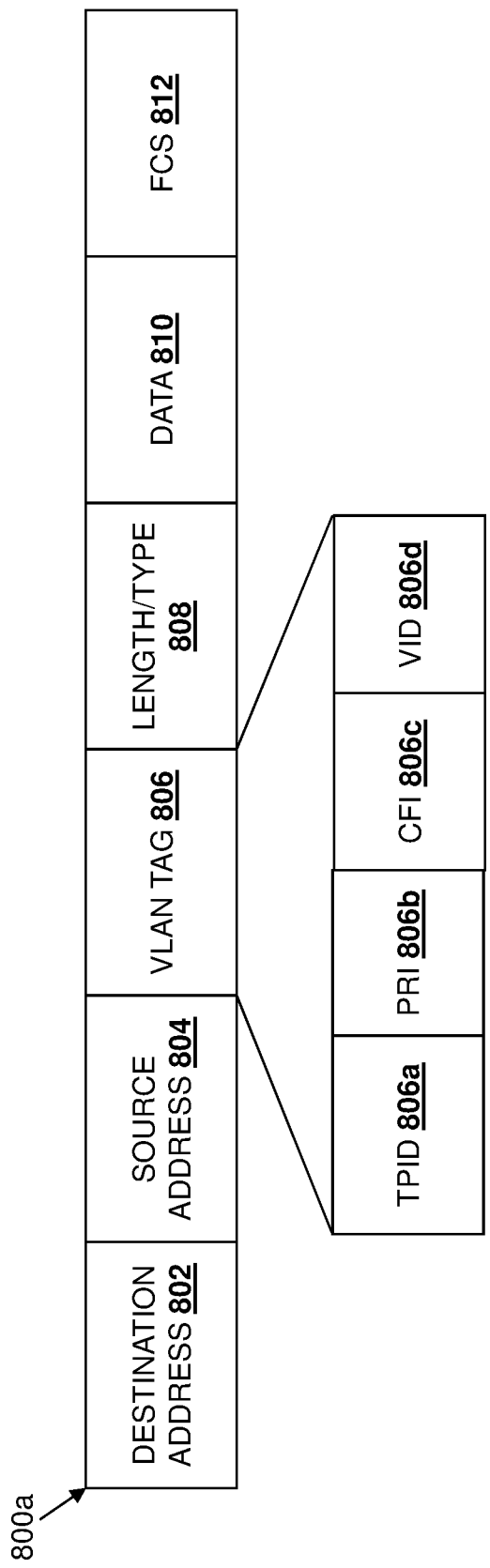
FIG. 8A is a block diagram illustrating an embodiment of a data frame used during the method of FIGS. 4A and 4B.

With reference to FIG. 8A the data frame 502 and/or 702 may be provided by a tagged frame 800a if the computing device 212 is another networking device such as a switch that inserted the VLAN tag. The tagged frame 800a (also referred to herein as a VLAN data frame) may include a destination address field 802 that may be 6 bytes and that include a destination address (e.g., a Media Access Control (MAC) address of the destination computing device) for the frame, a source address field 804 that may be 6 bytes and that includes a source address (e.g., a MAC address of the source computing device) for the frame, a VLAN tag field 806 that may be 4 bytes and that includes VLAN information, a Length/Type Field 808 that may be 2 bytes and that indicates a length and type of the frame, a data field 810 that may be 46-1500 bytes and that includes the data being sent, and a Frame Checksum (FCS) field 812 that may be 4 bytes and that includes a hash of the destination address, the source address, the VLAN tag, and the data, which one of skill in the art in possession of the present disclosure will appreciate allows a destination computing device to compute the hash value of the received frame and compare it to the hash value included in the FCS field in order to determine whether the frame 800 has been corrupted.

Furthermore, the VLAN tag field 806 may include a Tag Protocol Identifier (TPID) field 806a that may be 2 bytes and that indicates the frame type, a Priority (PRI) field 806b that may be 3 bits and that indicates the 802.1p priority of the tagged frame 800, a Canonical Format Indicator (CFI) field 806c that may be 1 bit and that indicates whether a MAC address is encapsulated in canonical format over different transmission media (e.g., to ensure compatibility between Ethernet and token ring networks), and a VLAN Identifier (VID) field 806d that may be 12 bits and that indicates the VLAN to which the tagged frame 800 belongs.

However, in other embodiments where the computing device is a host device/user terminal, the data frame 502 and/or 702 may be an untagged frame which may be substantially the same as the tagged frame 800a but without including the VLAN tag field 806. As such, upon receiving the data frame 502 and/or 702 that is untagged, the networking device 204 or 218 may add the VLAN tag field 806 and recalculate the hash in the FCS field 812. However, while the data frame 502 and/or 702 may be an untagged Ethernet frame when entering the L2 domain 202, the discussions herein assume that the data frame 502 and/or 702 is provided by the tagged frame 800a and is already tagged with the VLAN tag field 806 for clarity of discussion. Furthermore, while a specific data frame received by a networking device via an edge connection of the loop prevention system 200 has been illustrated and described, one of skill in the art in possession of the present disclosure will recognize that data frames may include a variety of fields other than those described above, and may be provided by other protocols that provide for L2 communications, while remaining within the scope of the present disclosure.

Figure 5B:
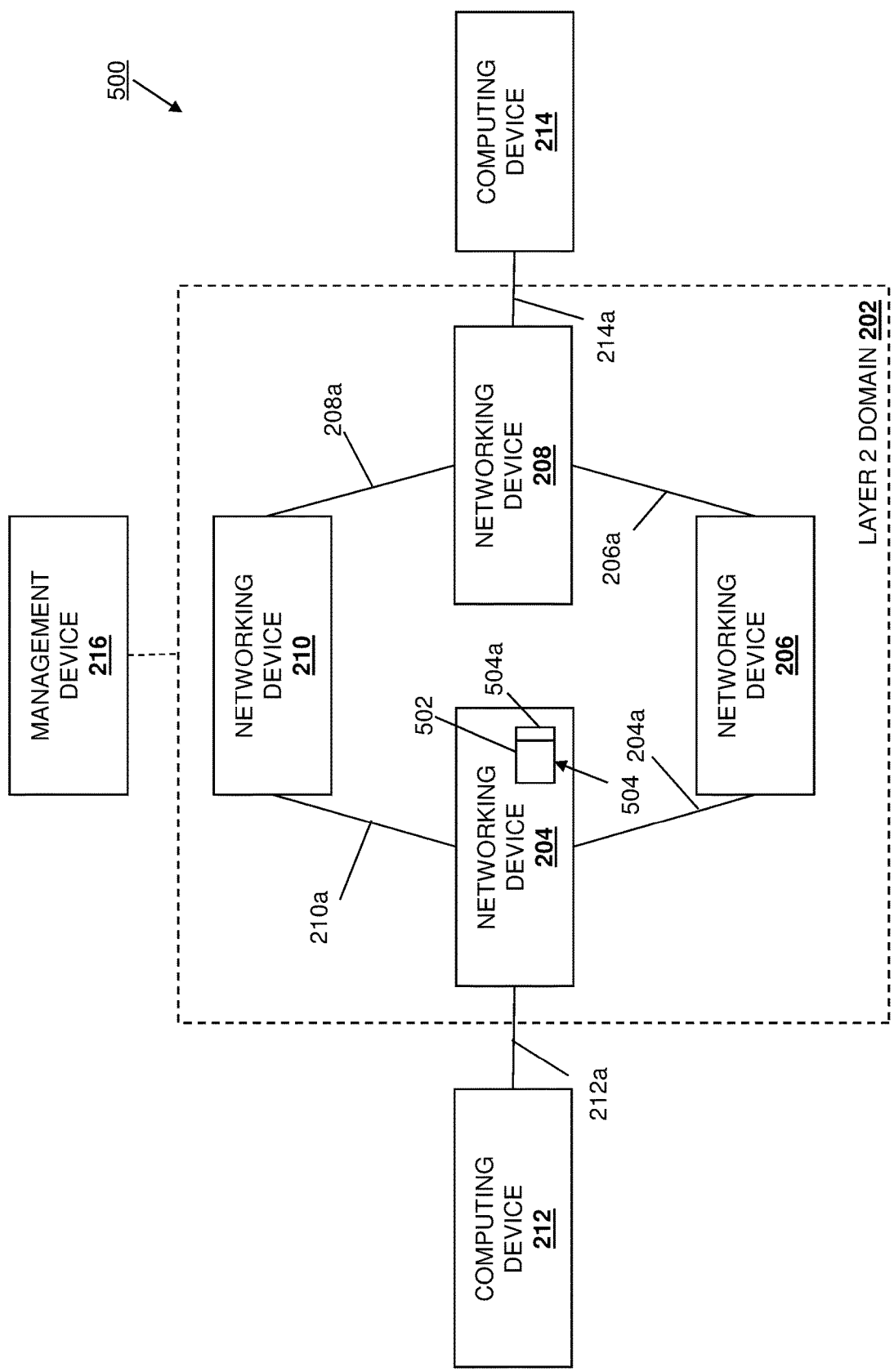
Figure 7B:
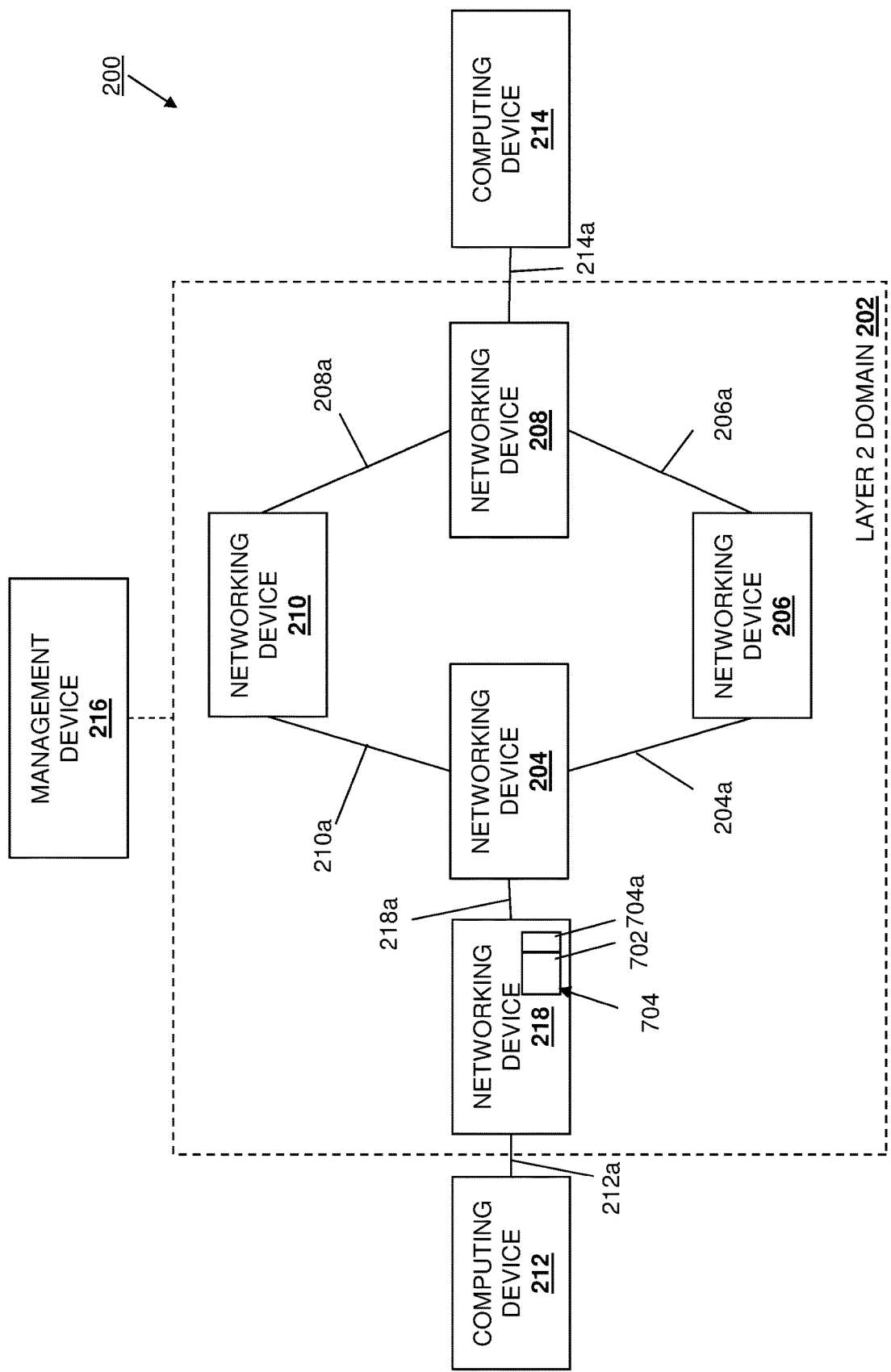
Figure 8B:
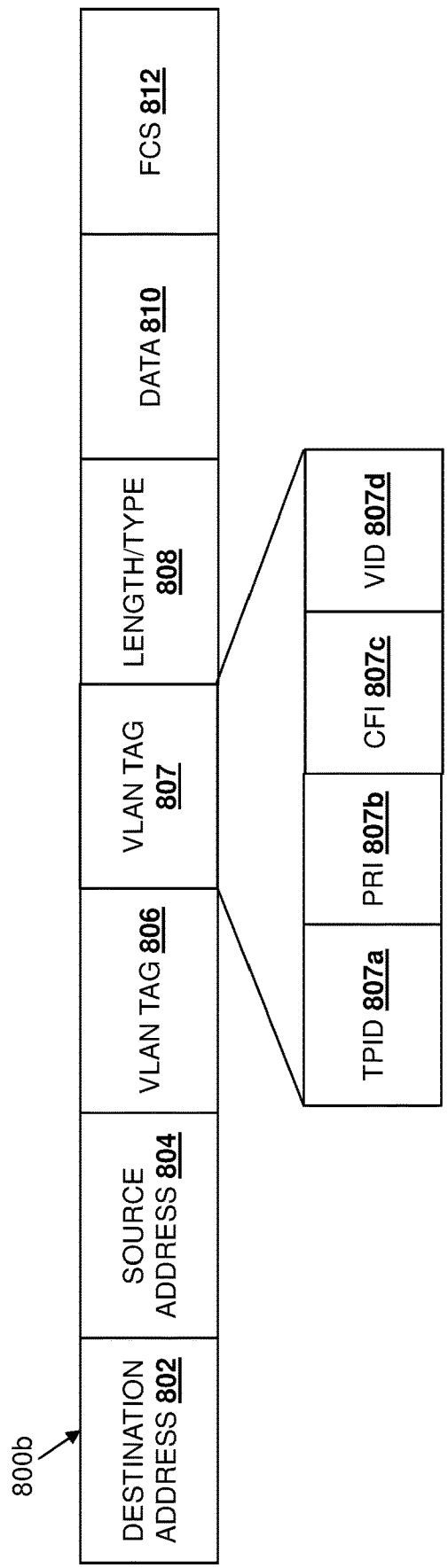
FIG. 8B is a block diagram illustrating an embodiment of a loop breaker data frame used during the method of FIGS. 4A and 4B.

The method 400 then proceeds to block 404 where a first loop breaker data frame is generated by tagging the first data frame with a first loop breaker tag. In an embodiment, at block 404, the networking device included in the L2 domain 202 that receives the data frame via an edge connection may tag the first data frame with a loop breaker tag. For example, and with reference to FIG. 5B, the networking device 204 may generate a loop breaker data frame 504 that includes the data frame 502 provided with a loop breaker tag 504a. Similarly, and with reference to FIG. 7B, the networking device 218 may generate a loop breaker data frame 704 that includes the data frame 702 and a loop breaker tag 704a. In various embodiments, the loop breaker tag 504a and/or 704a may include a second VLAN tag. With reference to FIG. 8B, a loop breaker data frame 800b is illustrated that may provide the loop breaker data frame 504 and/or 704. As illustrated in FIG. 8B, the loop breaker data frame 800b may include the destination address field 802, the source address field 804, the VLAN tag field 806, the Length/Type field 808, the data field 810, and the FCS field 812 that are included in the data frame 800a discussed above with reference to FIG. 8A. In addition, the loop breaker data frame 800b may include the VLAN tag 807 that may be the loop breaker tag 504a and/or 704a discussed above with reference to FIGS. 5B and 7B, respectively. For example, the VLAN tag 807 may be identical to the VLAN tag field 806, and may be positioned between the VLAN tag field 806 and the Length/Type field 808. As such, the VLAN tag 807 may be 2 bytes and include a TPID field 807a that may be 2 bytes, a PRI field 807b that may be 3 bits, a CFI field 807c that may be 1 bit, and a VID field 807d that may be 12 bits. However, while specific loop breaker data frames 504 and 704 are illustrated and described, one of skill in the art in possession of the present disclosure will recognize that other loop breaker tagged data frames may be provided while remaining within the scope of the present disclosure The method 400 then proceeds to decision block 406 where the method 400 proceeds depending on whether the networking device is designated as a loop breaker node. In an embodiment, at decision block 406, the method 400 may proceed depending on whether the networking device in the L2 domain 202 that received the data frame via the edge connection in block 402 and that generated the loop breaker frame in block 404 is designated as a loop breaker node. In some embodiments, prior to method 400, an administrator may designate one or more of the networking devices 204-210 discussed above with reference to FIG. 2A, or one or more of the networking devices 204-210 and 218 discussed above with reference to FIG. 2B, as loop breaker node(s). For example, the administrator may access the networking devices 204-210/300 and/or 218/300 via the management device 216 to enable or disable a loop breaker node setting in the configuration settings 306a in the loop prevention database 306 of that networking device. In specific examples, the administrator may know which networking devices 204-210 and/or 218 are provided in a physical loop and may cause a logical loop if the STP were to fail, and may designate one or more of the networking devices in each physical loop as a loop breaker node. In some embodiments, each networking device designated as a loop breaker node may also be assigned a tag value in the configuration settings 306a. For example, because the loop breaker tag 504a and/or 704a may be provided by a VLAN tag 807 that includes 4 bytes (e.g., 32 bits) and the TPID field 807a may be used to identify the tag protocol as VLAN such that the frame is not dropped, the administrator may assign a bit of the remaining 16 bits provided by the VLAN tag 807 (e.g., the 16 bits provided by the PRI field 807b, the CFI field 807c, and the VID field 807d) to that loop breaker node. As such, in the embodiments described herein, up to 16 networking devices included in the L2 domain 202 may be designated as loop breaker nodes.

Figure 5C:
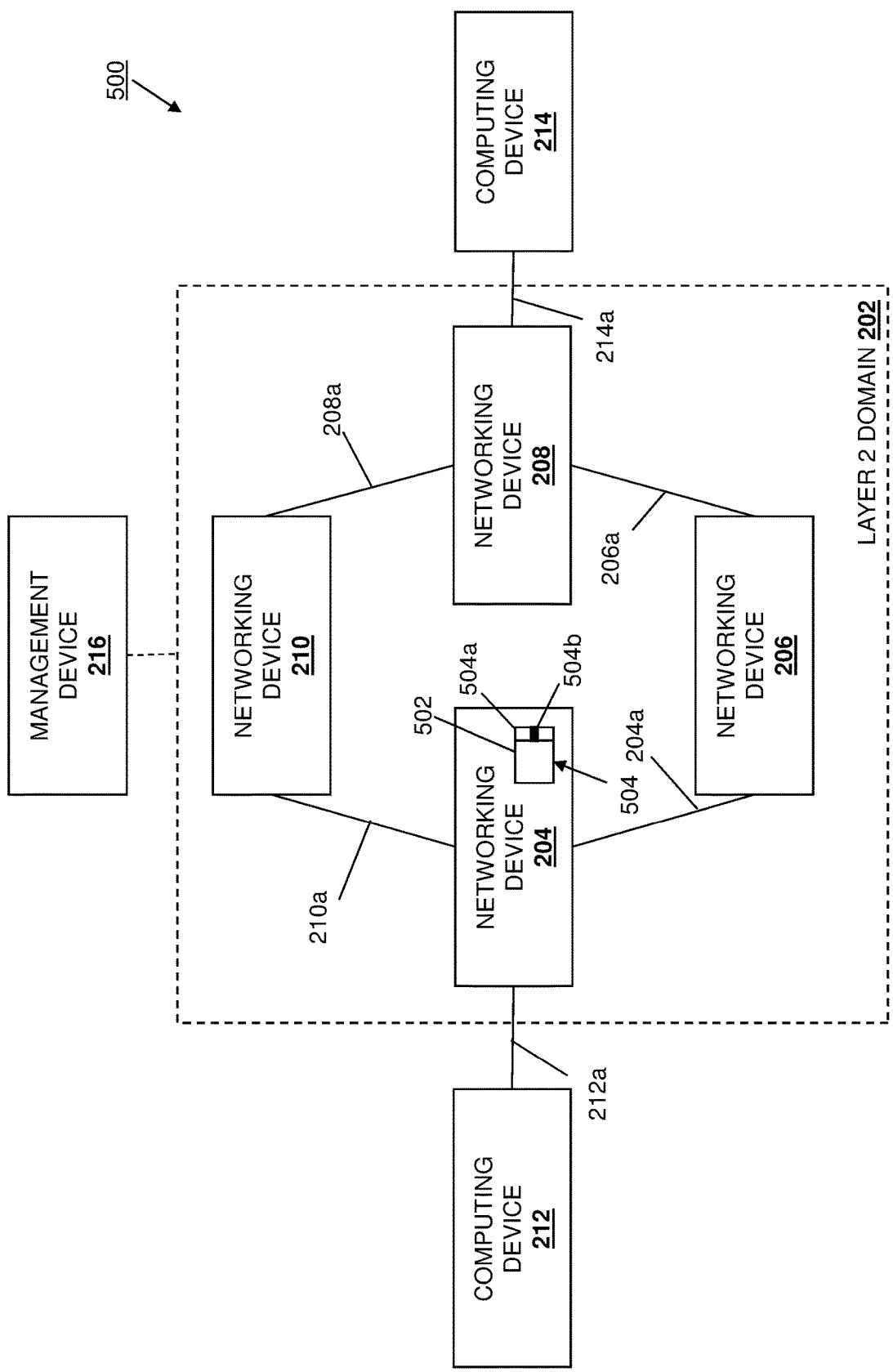

If, at decision block 406, the networking device is designated as a loop breaker node, then the method 400 may proceed to block 408 where that networking device inserts a tag value in the first loop breaker tag associated with that networking device prior to the forwarding of the first loop breaker data frame via at least one L2 domain connection. In an embodiment, at block 408, the networking device that received the data frame via the edge connection in block 402, that generated the loop breaker frame in block 404, and that is designated as a loop breaker node at decision block 406, may provide a tag value in the loop breaker tag according to the tag value that networking device was assigned by an administrator. For example, the tag value may be associated with a bit of the loop breaker tag (e.g., the VLAN tag 807 of the loop breaker data frame 800b), and that networking device may set that bit (e.g., in the VLAN tag 807). With reference to FIG. 5C, the networking device 204 may be designated as a loop breaker node, and may have been assigned a tag value of "2" that may be associated with the second bit of the VLAN tag 807 (which may be the second bit in the VID field 807d). In another example, the tag value assigned to the networking device 204 may be "3" that may be associated with the third bit of the VLAN tag 807 (which may be the second bit in the VID field 807d). As such, the tag value assigned to the networking device 204 may be any of "1"-"16" that may be associated with respective first to sixteenth bit of the VLAN tag 807.

In a specific example, if there are three networking devices are designated as loop breaker nodes where the first networking device is assigned a tag value of "7", the second networking device is assigned a tag value of "3", and the third networking device is assigned a tag value of "9", then the seventh bit of the VLAN tag 807 is set when the loop breaker data frame 800*b* is received by the first networking device, the third bit of the VLAN tag 807 is set when the loop breaker data frame 800*b* is received by the second networking device, and the ninth bit of the VLAN tag 807 is set when the loop breaker data frame 800*b* is received by the third networking device. With reference to the example illustrated in FIG. 5C, the networking device 204 may insert a tag value 504*b* into the loop breaker tag 504*a* included in the loop breaker data frame 504. Specifically, the networking device 204 may be assigned a tag value of "2", and thus may mark/set the second bit of the VLAN tag 807 (e.g., by setting a logical "0" to a logical "1" in the second bit of VLAN tag 807).

Figure 7C:
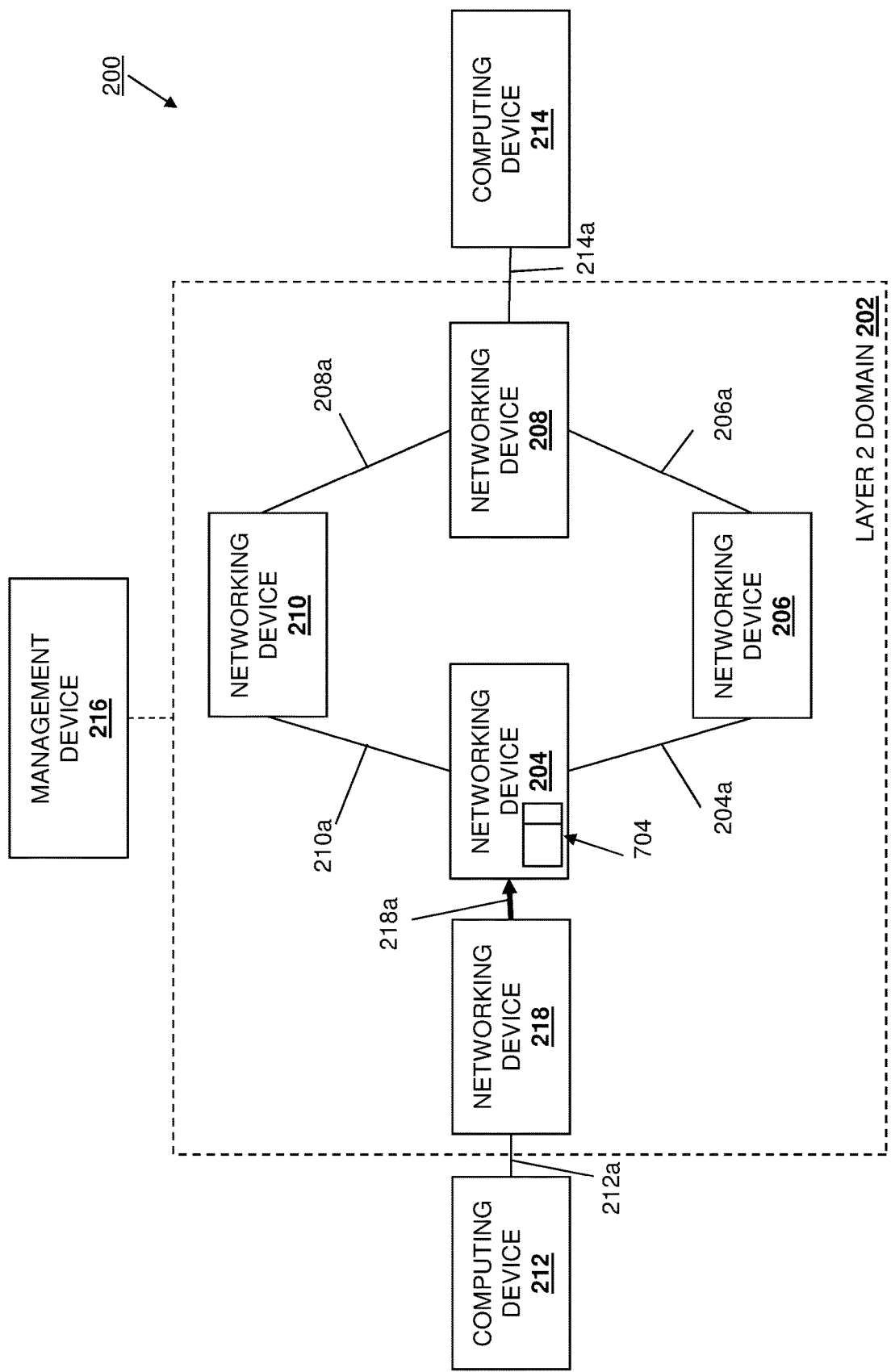

If, at decision block 406, the networking device is not designated as a loop breaker node, then the method 400 may proceed to block 410 where the networking device forwards the first loop breaker data frame via the at least one L2 domain connection. In an embodiment, at block 410, the networking device included in the L2 domain 202 that received the data frame via the edge connection in block 402, that generated the loop breaker frame in block 404, and that is not designated as a loop breaker node at decision block 406, may forward the first loop breaker data frame using conventional L2 forwarding techniques known in the art. For example, the networking device may reference the forwarding table 306*b*, along with the source address field 804 and the destination address field 802 in the loop breaker data frame 800*b*, to determine whether any of ports on that networking device are associated with a destination MAC address in the destination address field 802. If a port is associated with the destination MAC address, the networking device may then forward the loop breaker data frame via that port, while if no ports are associated with the destination MAC address, the networking device may forward (e.g., flood) the loop breaker data frame 800*b* on all of its ports but the ingress port (e.g., the port on which the data frame/loop breaker data frame was received by the networking device). With reference to FIG. 7C, the networking device 218 may forward the loop breaker data frame 704, which is unmarked, via the L2 domain connection 218*a* (as illustrated by the bolded arrow on network connection 218*a* in FIG. 7C).

Figure 5D:
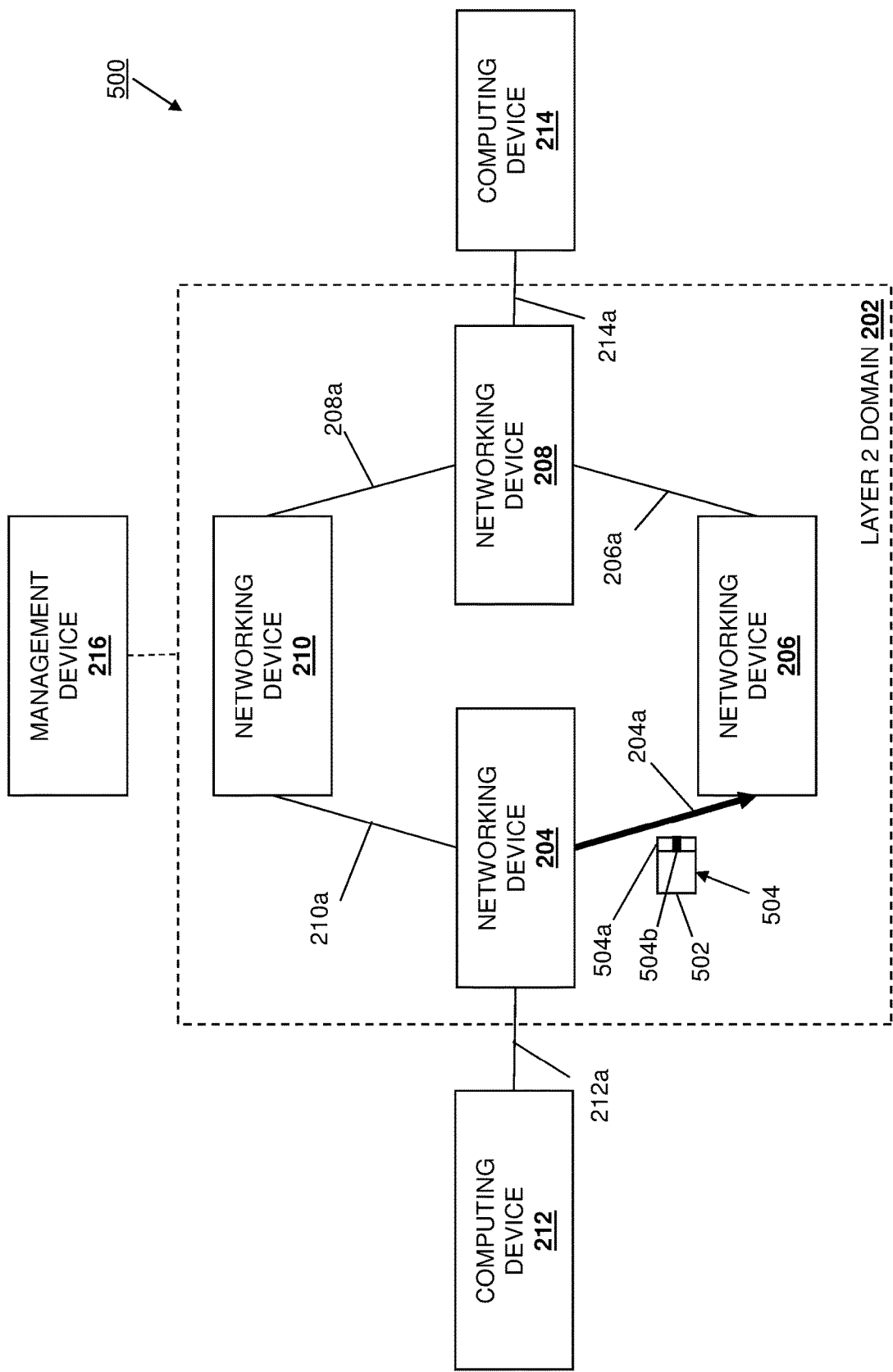

Similarly, block 410 may be performed following block 408 such that the loop breaker data frame 800*b*, which includes a tag value from the networking device that is designated as a loop breaker node, is forwarded via at least one L2 domain connection of that networking device. For example, and as illustrated in FIG. 5D, the networking device 204 may forward the loop breaker data frame 504 that is marked with the tag value 504*b* via the L2 domain connection 204*a* (as illustrated by the bolded arrow on network connection 204*a* in FIG. 5D). However, one of skill in the art will recognize that the data frame 502 may be forwarded via the L2 domain connection 210*a* as well, and/or any other L2 domain connections that are available.

Figure 5E:
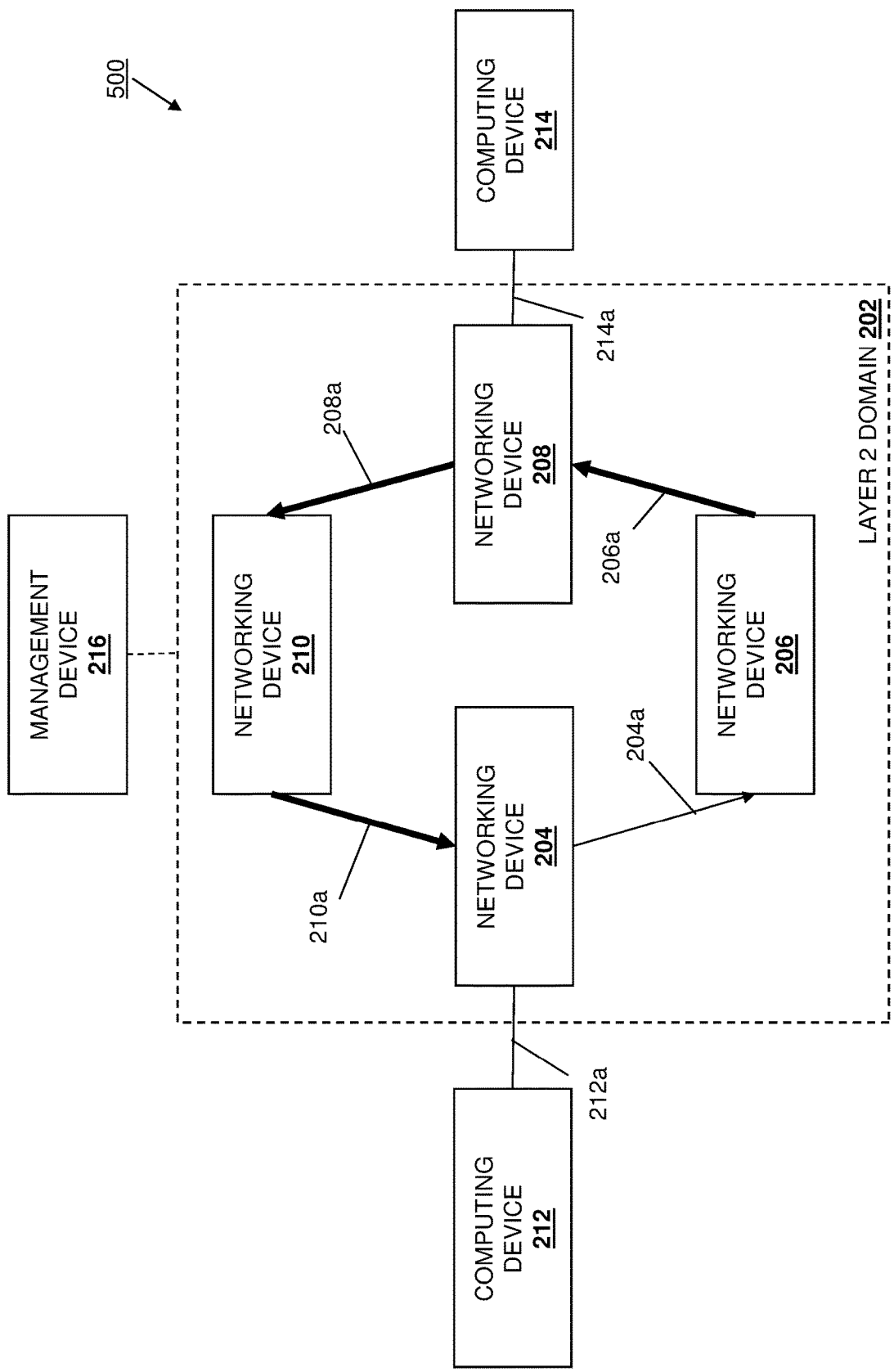

The method 400 then proceeds to block 412 the first networking device receives a loop breaker data frame that includes a loop breaker tag via the at least one L2 domain link. In an embodiment, at block 412, a networking device in the L2 domain 202 may receive a loop breaker data frame. With reference to FIG. 5E, the networking device 204 may receive the loop breaker data frame 504 after it has been forwarded by the networking device 206 via L2 domain connection 206*a*, by the networking device 208 via the L2 domain connection 208*a*, and by the networking device 210 via the L2 domain connection 210*a* (as illustrated by the bolded arrows on network connections 206*a*, 208*a*, and 210*a* in FIG. 5E). In another embodiment and with reference to FIG. 6A, the networking device 208 may receive the loop breaker data frame 504 discussed above with reference to FIG. 5B after the loop breaker data frame 504 has been forwarded by the networking device 206 via the L2 domain connection 206*a* (as illustrated by the bolded arrow on network connection 206*a* in FIG. 6A). In the example illustrated in FIGS. 6A-6C and as discussed below, the networking device 208 forwards the loop breaker data frame 504 out of the L2 domain 202. With reference to FIG. 7C, the networking device 204 may receive the loop breaker data frame 704 via the L2 domain connection 218*a* (as illustrated by the bolded arrow on network connection 218*a* in FIG. 7C).

The method 400 proceeds to decision block 414 where the method 400 proceeds depending on whether the networking device is designated as a loop breaker node. In an embodiment, at decision block 414 and when the networking device in the L2 domain 202 receives loop breaker data frame that includes the loop breaker tag, the method 400 proceeds depending on whether that networking device is designated as a loop breaker node in a manner that is similar to decision block 406, discussed above. If the networking device is designated as a loop breaker node, the method 400 proceeds to decision block 416 where it is determined whether the tag value assigned to that networking device is present in the loop breaker data frame. In an embodiment, at decision block 416, the networking device in the L2 domain 202 that is designated as a loop breaker node may compare its assigned tag value to any tag values present in the loop breaker tag of the loop breaker data frame it received to determine whether its tag value is present in the loop breaker tag. For example, the networking device may have been assigned a tag value of "2", and at decision block 416 may determine whether the second bit of the VLAN tag 807 of the loop breaker data frame 800*b* is set or not set (e.g., a logical "1" or a logical "0").

If, at decision block 416, the tag value assigned to the networking device is present in the loop breaker data frame, then the method 400 may proceed to block 418 where the loop breaker data frame is dropped. In an embodiment, at block 418, the networking device in the L2 domain 202 that receives a loop breaker data frame that includes the tag value assigned to that networking device may block or otherwise drop that loop breaker data frame. For example, the second bit of the VLAN tag 807 of the loop breaker data frame 800*b* may be set, and when the networking device that previously set that bit in the VLAN tag 807 receives the loop breaker data frame 800*b*, that networking device will recognize that a logical loop exists in the L2 domain 202 and will operate to drop or otherwise block that loop breaker data frame 800*b* from being forwarded on any of its L2 domain connections.

Figure 5F:
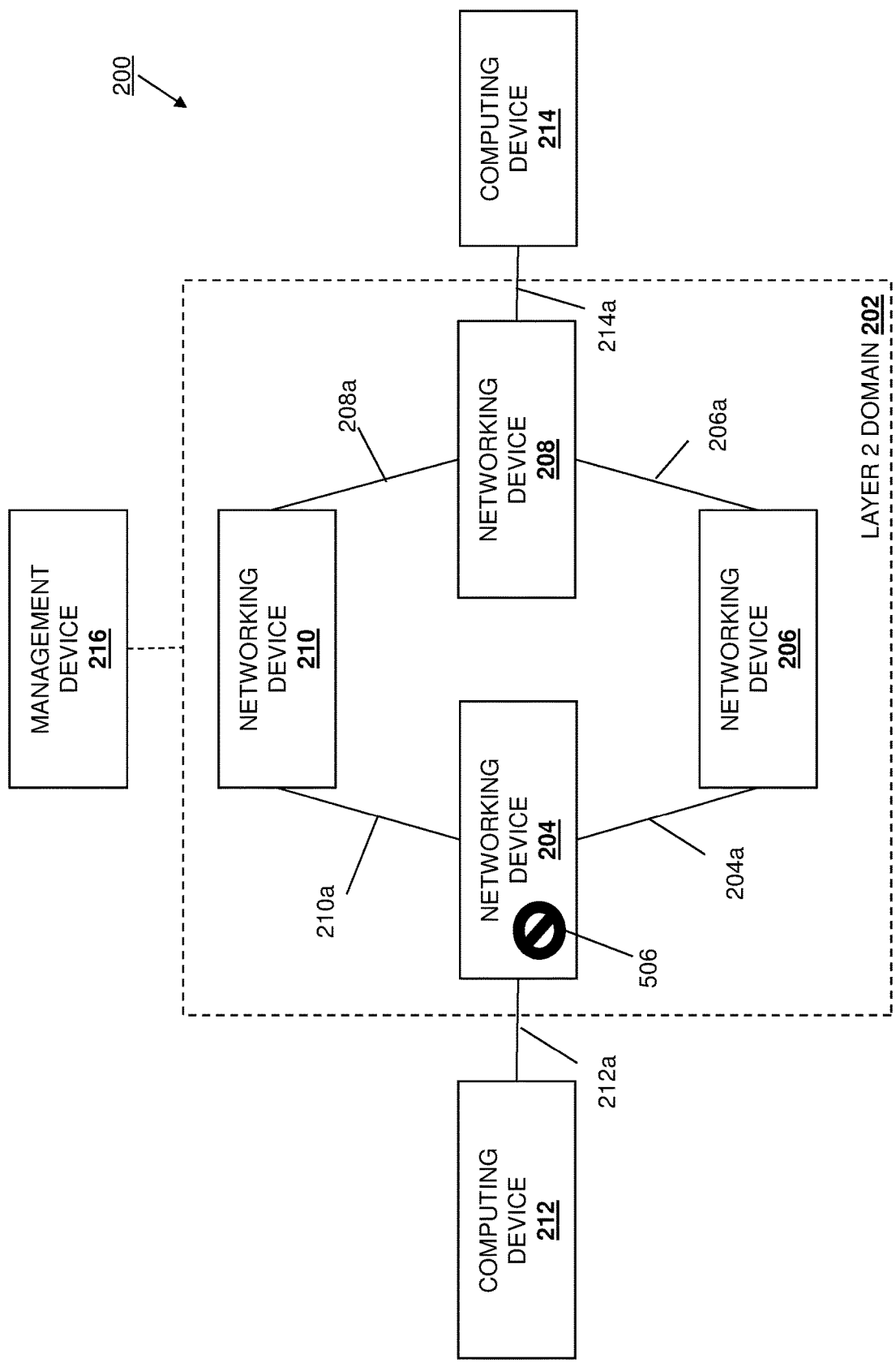

For example, and with reference to FIGS. 5E and 5F, the networking device 204 may have received the loop breaker data frame 504 via the L2 domain connection 210*a* as discussed above, may be designated as a loop breaker node according to its configuration settings 306*a*, and may have been assigned a tag value of "2". The networking device 204 may check the second bit that corresponds with a tag value 504 of "2" in the loop breaker tag 504*a* included in the loop breaker data frame 504, and because the second bit (e.g., tag value 504b) is marked, the networking device 204 may determine that it already forwarded the loop breaker data frame 504 (and thus a logical loop exists in the L2 domain 202), and may drop the loop breaker data frame 504 as indicated by an indicator 506.

The method 400 may then proceed to block 420 where a notification is sent to an administrator to alert the administrator of a logical loop in the L2 domain 202. In an embodiment, at block 420 and with reference to the example discussed above with reference to FIGS. 5A-5F, the networking device 204 may alert an administrator of the L2 domain 202 that a logical loop exists in the L2 domain 202. As will be appreciated by one of skill in the art in possession of the present disclosure, while the networking device 204 may prevent the L2 domain 202 from going down by preventing data frames from continuously looping in the L2 domain 202, the networking device 204 does not actually fix the logical loop. As such, a notification to an administrator that a logical loop exists in the L2 domain 202 may cause the administrator to investigate the issue and determine why the STP is not preventing logical loops. Thus, the systems and methods of the present disclosure prevent the network and its networking devices from going down so that the administrator can investigate and correct issues with the STP. In an embodiment, at block 420, the networking device 204 may log the dropped loop breaker data frame 504 and provide the log to the management device 216. However, one of skill in the art in possession of the present disclosure will recognize that other alerts and/or notifications may be provided to an administrator while falling under the scope of the present disclosure.

If, at decision block 414, the networking device is not designated as a loop breaker node, or if at decision block 416 the networking device that is designated as a loop breaker node determines that the tag value assigned to that networking device is not present in the loop breaker data frame, then the method 400 proceeds to decision block 422 where it is determined whether the loop breaker data frame should exit from the L2 domain. In an embodiment, at decision block 422, the networking device in the L2 domain 202 that received the loop breaker data frame may determine whether that loop breaker data frame should exit out of the L2 domain 202. For example, the networking device may determine whether any forwarding rules in the forwarding table 306b cause the loop breaker data frame to exit out of the networking device on an edge connection (e.g., edge connections 212a or 214a). In some examples, the loop breaker data frame may be forwarded to another L2 domain, while in other examples, the loop breaker data frame be forwarded to a router that is included in the L2 domain 202. One of skill in the art in possession of the present disclosure will recognize that designating routers as being "outside" the L2 domain 202 may prevent issues that result when the routing of the loop breaker data frame is a reverse path that may cause the loop breaker data frame to be inadvertently dropped when received back on the same networking device as discussed above even when no actual logical loop exists. In yet other examples, the loop breaker data frame may be destined to a computing device 212 and/or 214 that may be an end host (e.g., a destination identified by the destination MAC address in the destination address field 802 of the loop breaker data frame 800b).

If, at decision block 422, it is determined that the loop breaker data frame should exit the L2 domain, then the method 400 may proceed to block 424 where the loop breaker tag is removed from the loop breaker data frame. In an embodiment, at block 424, the networking device removes the loop breaker tag from the loop breaker data frame to generate the data frame that entered the L2 domain 202. For example, the networking device may remove at least the VLAN tag 807 from the loop breaker data frame 800b to generate the data frame 800a. The networking device may then calculate the hash of the data frame without the VLAN tag 807 and insert the hash in the FCS field 812 of the data frame 800a. One of skill in the art in possession of the present disclosure will recognize that, in some instances, the VLAN tag field 806 may also be removed (e.g., instances where the computing device 212 and/or 214 is an end host and the data frame 800a is to be forward via the edge connection 212a and/or 214a).

Figure 6A:
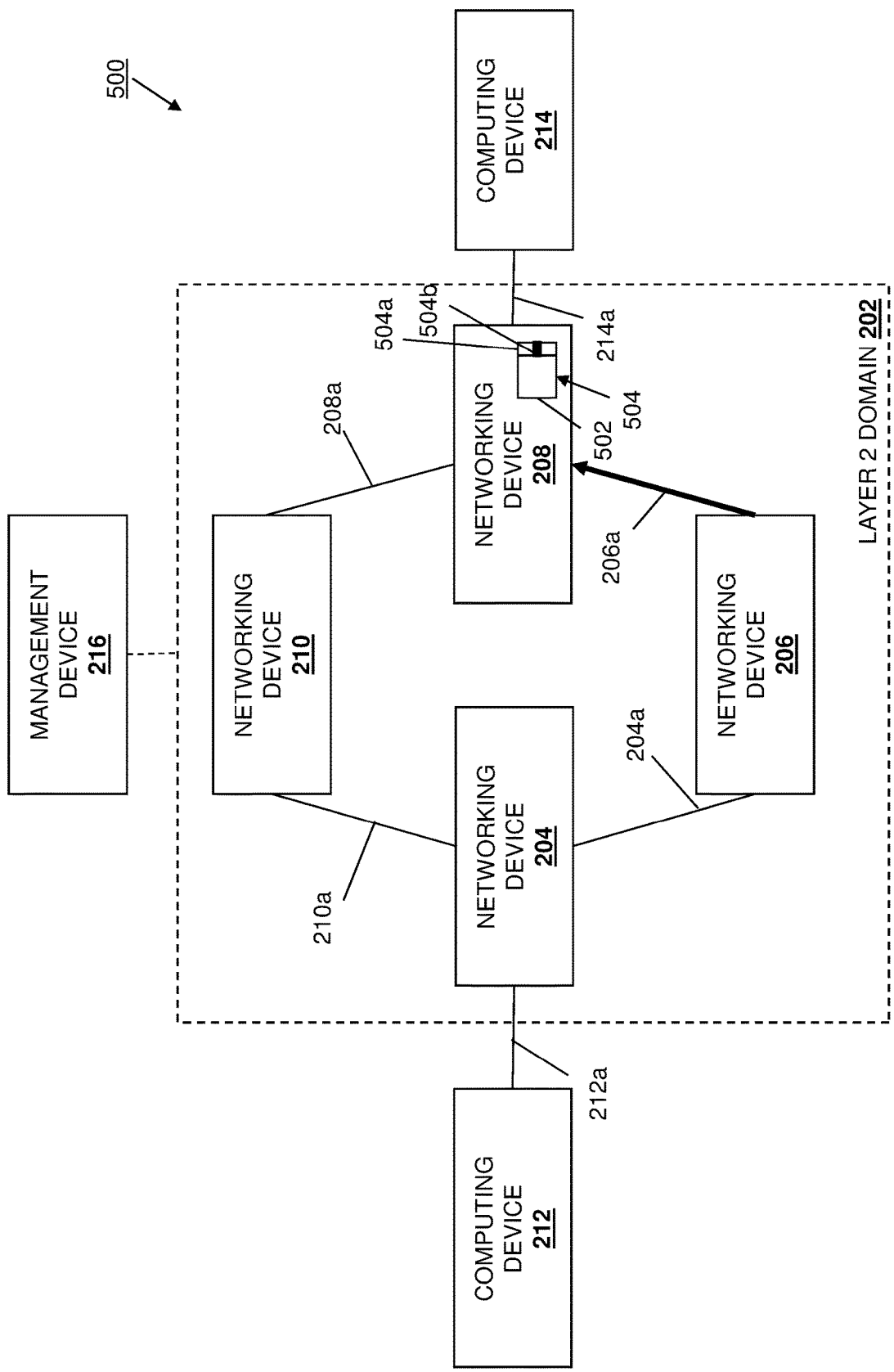
FIGS. 6A-6C are schematic views illustrating an embodiment of the loop prevention system of FIG. 2A operating during the method of FIGS. 4A and 4B.
Figure 6B:
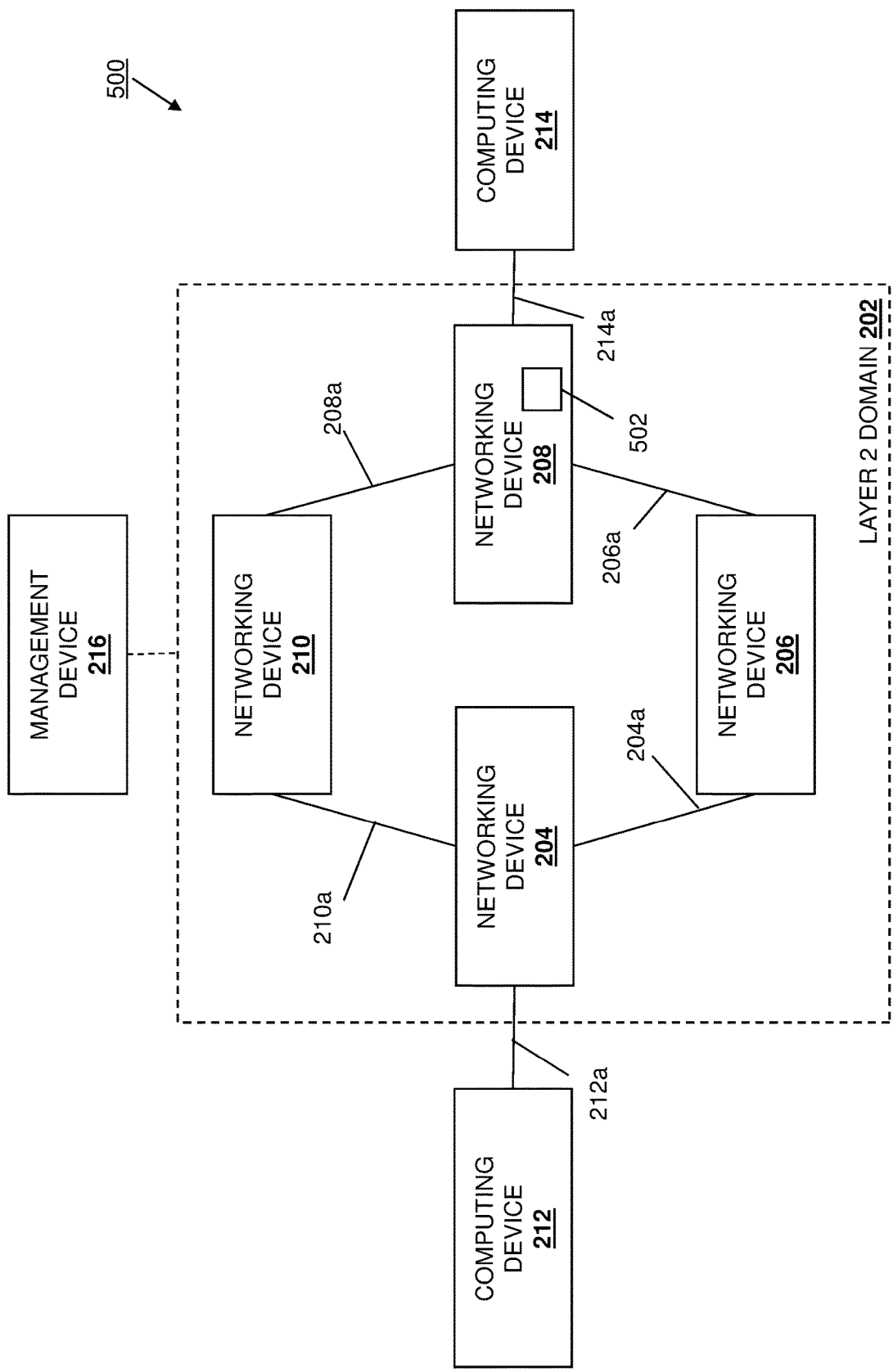
Figure 6C:
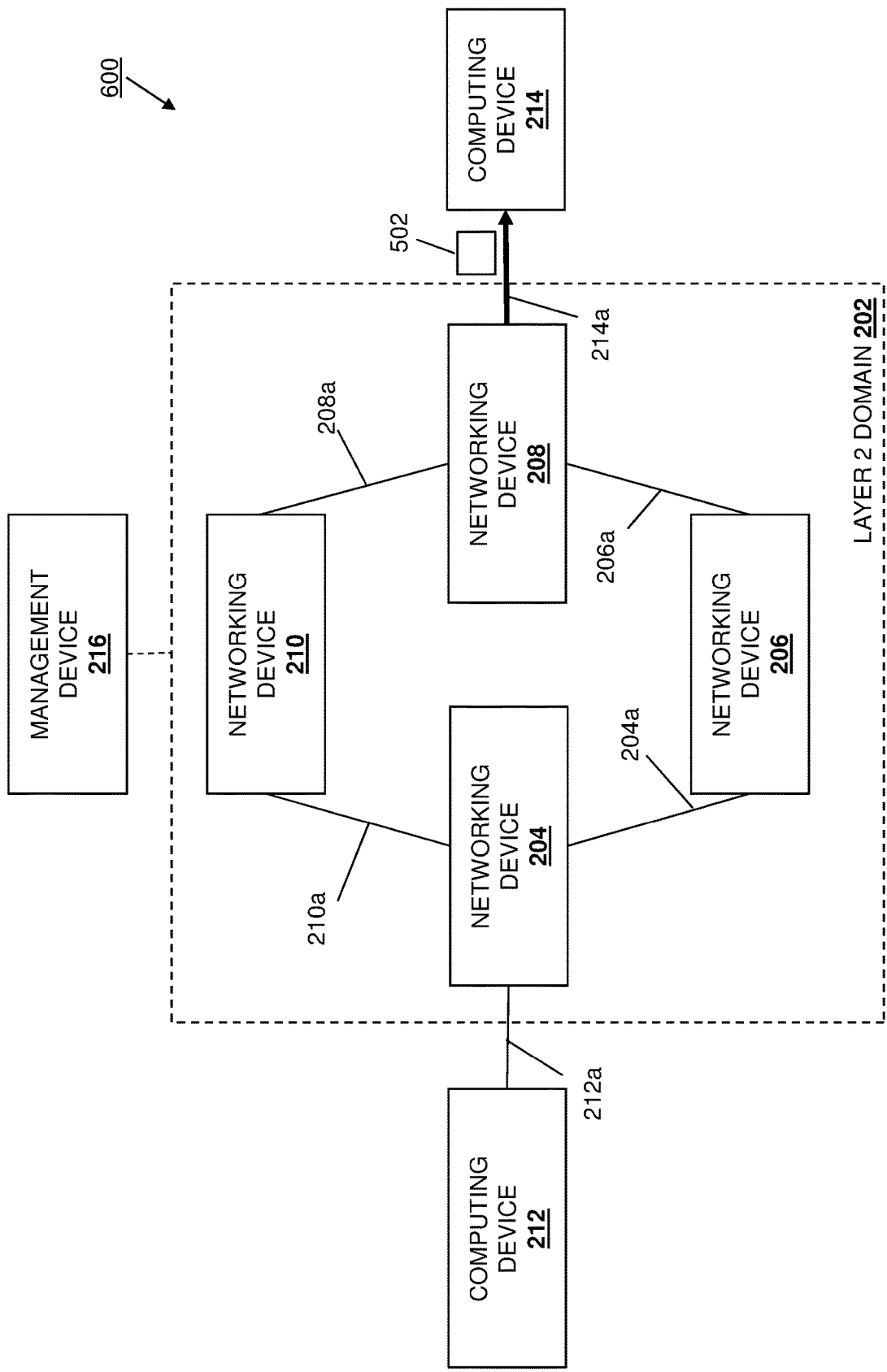

The method 400 may then proceed to block 426 where the networking device forwards the data frame via the edge connection. In an embodiment, at block 426, the networking device in the L2 domain 202 may then forward the data frame 800a via the edge connection (e.g., the edge connection 212a and/or 214a). With reference to FIG. 6A, the networking device 208 may receive the loop breaker data frame 504 via the L2 domain connection 206a (as illustrated by the bolded arrow on network connection 206a in FIG. 6A). The networking device 208 may determine that the loop breaker data frame 504 is to be forwarded to the computing device 214 via the edge connection 214a. The networking device 208 may remove the loop breaker tag 504a that includes the tag value 504b assigned by the networking device 204, as illustrated in FIG. 6B. As will be appreciated by one of skill in the art in possession of the present disclosure, by removing the loop breaker tag 504a, the networking device 208 generates the data frame 502 that entered the L2 domain 202. However, in some examples, the data frame 502 that exits that L2 domain 202 may be different than the data frame that entered the L2 domain 202. The networking device 208 may then forward the data frame 502 to the computing device 214 via the edge connection 214a, as illustrated in FIG. 6C.

Figure 7D:
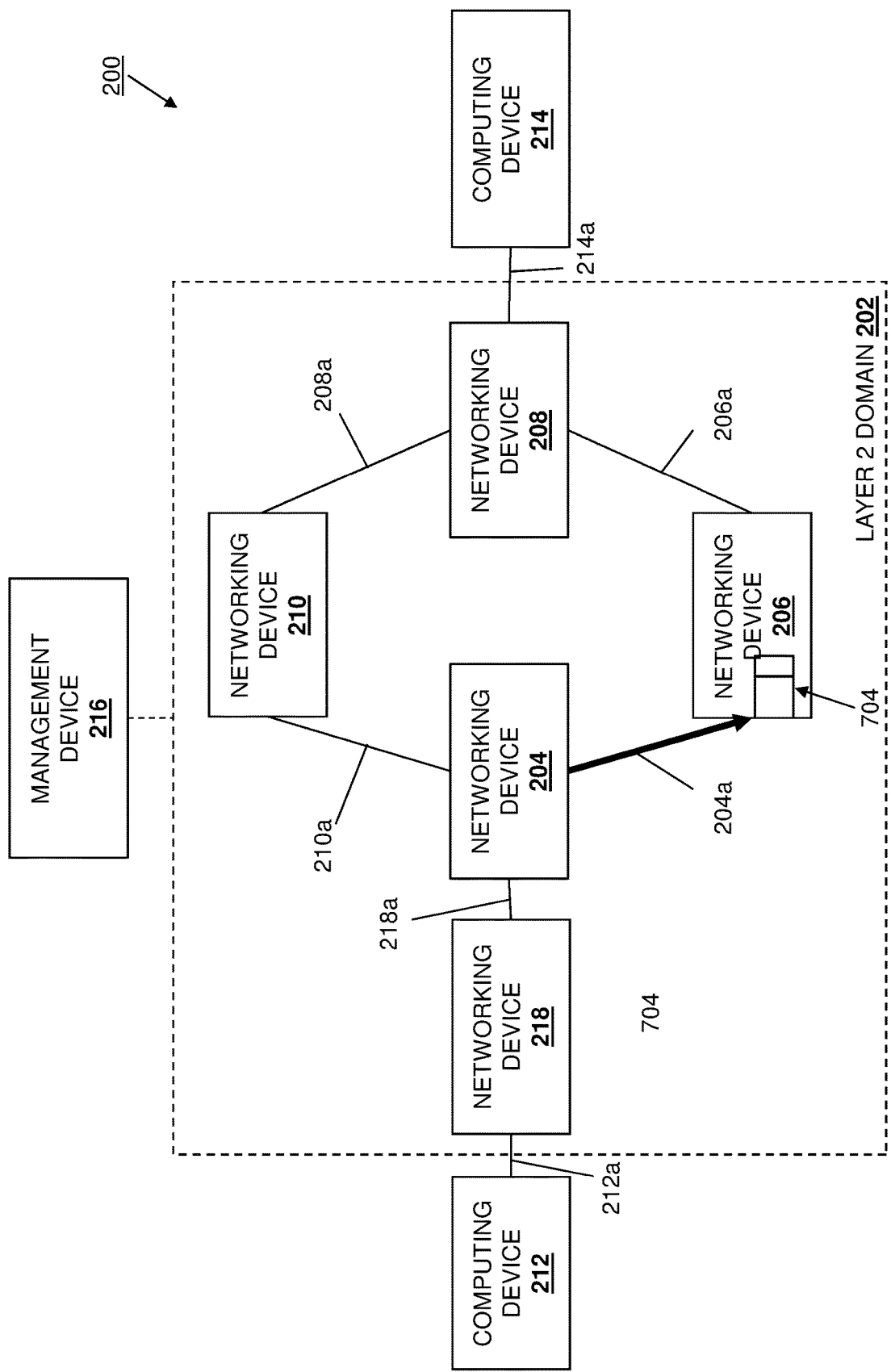
Figure 7E:
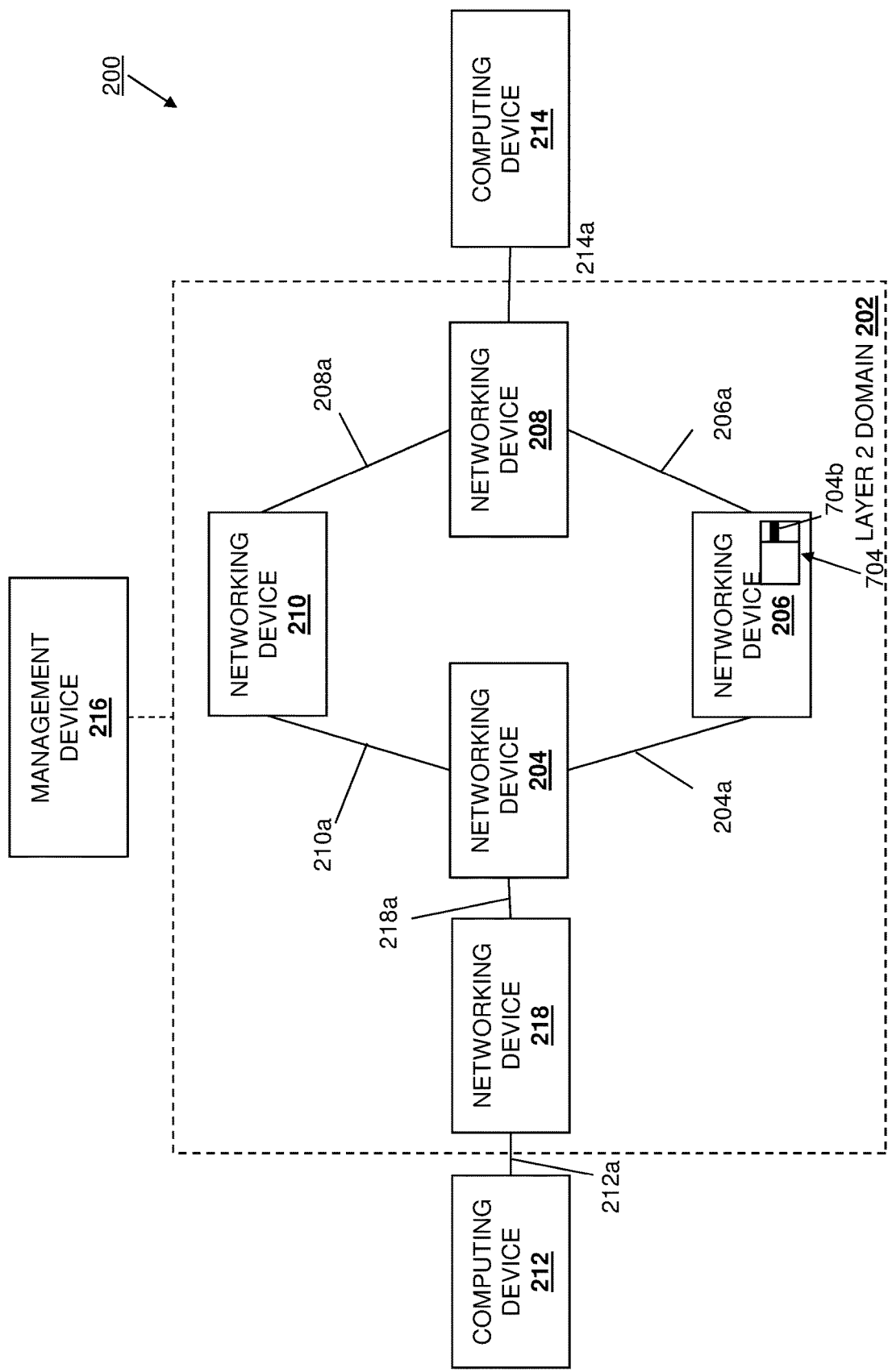
Figure 7F:
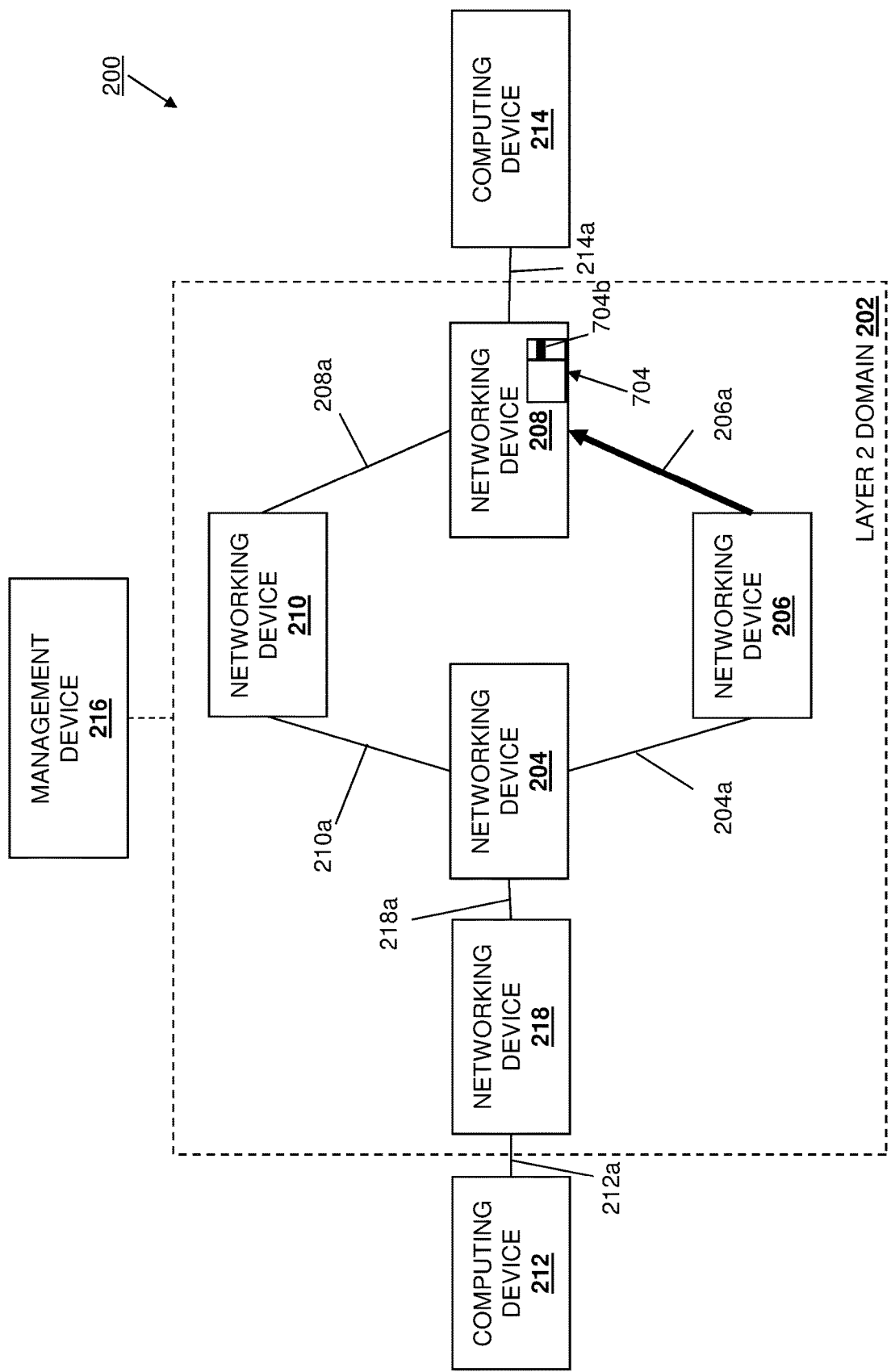

If, at decision block 422, it is determined that the loop breaker data frame is to remain in the L2 domain, then the method 400 may proceed back to decision block 406-410 where the networking device processes the loop breaker data frame and forwards the loop breaker data frame according to conventional L2 protocols and via one or more of its L2 domain connections. In an embodiment, the networking device in the L2 domain 202 that receives the loop breaker data frame via one of its L2 domain connections may forward that loop breaker data frame via one or more of the other L2 domain connections similarly as discussed above with reference to block 410. In some embodiments, the networking device that receives the loop breaker data frame 800b may be designated as a loop breaker node and may insert its tag value into the loop breaker tag (e.g., the VLAN tag 807) included in the loop breaker data frame 800b prior to forwarding the loop breaker data frame 800b, similarly as discussed above with reference to blocks 408 and 410. For example, and as illustrated in FIG. 7C, the networking device 204 may receive the loop breaker data frame 704 that includes the loop breaker tag 704a via the L2 domain connection 218a (as illustrated by the bolded arrow on network connection 218a in FIG. 7C). In this example, the networking device 204 is not designated as a loop breaker node, while the networking device 206 is designated as a loop breaker node with a tag value of "3". As illustrated in FIG. 7D, the networking device 204 may forward the loop breaker data frame 704 to the networking device 206 via the L2 domain connection 204a (as illustrated by the bolded arrow on network connection 204a in FIG. 7D), with no tag value indicated at this step in this example. The networking device 206 may then insert its tag value 704b (e.g., by setting the third bit of the VLAN tag 807), as illustrated in FIG. 7E, and may forward the loop breaker data frame 704 that includes the tag value 704b via the L2 domain connection 206a, as illustrated by the bolded arrow on network connection 206a in FIG. 7F. If the networking device 206 determines that its tag value 704b is already present in the loop breaker data frame 704, the networking device 206 may drop the loop breaker data frame 704 according to block 418 of method 400.

Thus, systems and methods have been described that provide a loop prevention system that includes a plurality of networking devices in a loop configuration, with at least one of the networking devices designated as a loop breaker node. The loop breaker node may receive a loop breaker data frame, insert a tag value into a loop breaker tag included in the loop breaker data frame, and forward the loop breaker data frame via its L2 domain connections. Upon subsequently receiving a loop breaker data frame, the loop breaker node will check to determine whether its assigned tag value is present in that loop breaker data frame. If the tag value is present, the loop breaker node will drop or otherwise block the loop breaker data frame from being forwarded, and alert an administrator that logical loop is present in the L2 domain. The loop prevention system of the present disclosure thus operates to break logical loops without completely blocking any of the links that provide the loop configuration, which prevents the network, its networking devices, and its applications from going down because of looping traffic when the STP in the L2 domain has an issue that is either temporary or that requires administrator action to correct.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and, in a manner, consistent with the scope of the embodiments disclosed herein.

What is claimed is:

1. A loop prevention system, comprising:
a plurality of networking devices that are coupled together to form a Layer-Two (L2) domain, wherein at least a portion of the plurality of networking devices are coupled together in a physical loop configuration, and wherein a first networking device included in the plurality of networking devices includes:
at least one first L2 domain connection that couples the first networking device to at least one of the plurality of networking devices in the L2 domain; and
an edge connection that connects the first networking device to a computing device that is outside of the L2 domain, wherein the first networking device is configured to:
receive, through the edge connection, a first data frame;
generate a first loop breaker data frame by tagging the first data frame with a first loop breaker tag; and
forward, via the at least one first L2 domain connection, the first loop breaker data frame,
wherein a second networking device that is included in the plurality of networking devices and that is designated as a loop breaker node is configured to:
receive, through the at least one first L2 domain connection from the first networking device, the first loop breaker data frame;
set a second bit that is included in a first plurality of bits in the first loop breaker tag and that is identified by a second tag value assigned to the second networking device via its designation as a loop breaker node; and
forward, via at least one second L2 domain connection, the first loop breaker data frame.

2. The loop prevention system of claim 1, wherein the first data frame includes a first Virtual Local Area Network (VLAN) tag, and wherein the first loop breaker tag includes a second VLAN tag.

3. The loop prevention system of claim 1, wherein the first networking device is designated as a loop breaker node and is configured to:
set, prior to the forwarding of the first loop breaker data frame via the at least one first L2 domain connection, a first bit that is included in a first plurality of bits in the first loop breaker tag and that is identified by a first tag value assigned to the first networking device via its designation as a loop breaker node.

4. The loop prevention system of claim 3, wherein the first networking device is configured to:
receive, via the at least one first L2 domain connection, a second loop breaker data frame that includes a second loop breaker tag that includes a second plurality of bits;
determine, based on the first tag value assigned to the first networking device, that the first bit that is included in the second plurality of bits in the second loop breaker tag is set; and
drop the second loop breaker data frame.

5. The loop prevention system of claim 4, further comprising:
a management system coupled to each of the plurality of networking devices, wherein the first networking device is configured to:
send, via a management system connection, an alert that a data frame loop has been detected in the L2 domain.

6. The loop prevention system of claim 1, wherein the second networking device is configured to:
receive, via the at least one first L2 domain connection or the at least one second L2 domain connection, the first loop breaker data frame;
determine, based on the second tag value assigned to the second networking device, that the second bit that is included in the second plurality of bits in the first loop breaker tag is set;
and
drop the first loop breaker data frame.

7. The loop prevention system of claim 1, wherein the first networking device is configured to:
receive, via the at least one first L2 domain connection, a second loop breaker data frame that includes a second loop breaker tag;
determine that the second loop breaker data frame is destined to egress out of the L2 domain via the edge connection;
generate a second data frame by removing the second loop breaker tag; and
forward, via the edge connection, the second data frame.

8. An Information Handling System (IHS), comprising:
a processing system; and
a memory system coupled to the processing system and including instructions that, when executed by the processing system, cause the processing system to provide a loop prevention engine that is configured to:
receive, via an edge connection that is connected to a computing device that is outside of a first Layer-Two (L2) domain, a first data frame;
generate a first loop breaker data frame by tagging the first data frame with a first loop breaker tag;
set a first bit that is included in a first plurality of bits in the first loop breaker tag and that is identified by a first tag value assigned to the loop prevention engine via its designation as a loop breaker node;
forward, via at least one L2 domain connection that is coupled to one or more of a plurality of networking devices that are coupled together to form the L2 domain and that are connected in a loop configuration, the first loop breaker data frame;
receive, via the at least one L2 domain connection, a second loop breaker data frame that includes a second loop breaker tag that includes a second plurality of bits;
determine, based on the first tag value assigned to the loop prevention engine via its designation as a loop breaker node, that the first bit that is included in the second plurality of bits in the second loop breaker tag is set; and
drop the second loop breaker data frame.

9. The IHS of claim 8, wherein the first loop breaker data frame includes a first Virtual Local Area Network (VLAN) data frame, the first loop breaker tag includes a first VLAN tag, the second loop breaker data frame includes a second VLAN data frame, the second loop breaker tag includes a second VLAN tag.

10. The IHS of claim 9, wherein the first plurality of bits in the first loop breaker tag are included in a first VLAN IDentifier (VID) field, and the second plurality of bits in the second loop breaker tag are included in a second VID field.

11. The IHS of claim 10, wherein the first bit that is included in the first plurality of bits in the first loop breaker tag and the second bit that is included in the second plurality of bits in the second loop breaker tag are set by changing a logical zero to a logical one.

12. The IHS of claim 10, wherein the loop prevention engine is configured to:
receive, via the at least one L2 domain connection, a third loop breaker data frame that includes a third loop breaker tag that includes a third plurality of bits;
determine, based on the first tag value assigned to the assigned to the loop prevention engine via its designation as a loop breaker node, that the first bit in the second loop breaker tag is not set;
determine that the third loop breaker data frame is to be forwarded via the at least one L2 domain connection;
set the first bit that is included in the third plurality of bits in the third loop breaker tag that is identified by the first tag value; and
forward, via the at least one L2 domain connection, the third loop breaker data frame.

13. The IHS of claim 8, wherein the loop prevention engine is configured to:
send, via a management system connection to a management device in response to determining that the first bit that is included in the second plurality of bits in the second loop breaker tag is set, an alert that a data frame loop has been detected in the L2 domain.

14. The IHS of claim 8, wherein the loop prevention engine is configured to:
receive, via the at least one L2 domain connection, a third loop breaker data frame that includes a third loop breaker tag;
determine that the third loop breaker data frame is destined to egress out of the L2 domain via the edge connection;
generate a fourth data frame by removing the third loop breaker tag; and
forward, via the edge connection, the third data frame.

15. A method for preventing loops, comprising:
receiving, via an edge connection by a first networking device that is included in a plurality of networking devices that form a Layer-Two (L2) domain and that is connected to a computing device that is outside of the L2 domain, a first data frame;
generating, by the first networking device, a first loop breaker data frame by tagging the first data frame with a first loop breaker tag;
forwarding, by the first networking device and via at least one first L2 domain connection that is coupled to one or more of the plurality of networking devices that form the L2 domain and that are connected in a loop configuration, the first loop breaker data frame;
receiving, the at least one first L2 domain connection by a second networking device that is included in the plurality of networking devices that form the L2 domain through, the first loop breaker data frame;
setting, by the second networking device, a second bit that is included in a first plurality of bits in the first loop breaker tag and that is identified by a second tag value assigned to the second networking device via its designation as a loop breaker node; and
forwarding, via at least one second L2 domain connection by the second networking device, the first loop breaker data frame.

16. The method of claim 15, wherein the first data frame includes a first Virtual Local Area Network (VLAN) tag, and wherein the first loop breaker tag includes a second VLAN tag.

17. The method of claim 15, wherein the first networking device is designated as a loop breaker node and the method further comprises:
setting, by the first networking device and prior to the forwarding of the first loop breaker data frame via the at least one first L2 domain connection, a first bit that is included in a first plurality of bits in the first loop breaker tag and that is identified by a first tag value assigned to the first networking device via its designation as a loop breaker node.

18. The method of claim 17, further comprising:
receiving, by the first networking device and via the at least one first L2 domain connection, a second loop breaker data frame that includes a second loop breaker tag that includes a second plurality of bits;
determining, by the first networking device and based on the first tag value assigned to the first networking device, that the first bit that is included in the second plurality of bits in the second loop breaker tag is set; and
dropping, by the first networking device, the second loop breaker data frame.

19. The method of claim 17, further comprising:
receiving, by the second networking device and via the at least one first L2 domain connection or the at least one second L2 domain connection, the first loop breaker data frame;

determining, by the second networking device and based on the second tag value assigned to the second networking device, that the second bit that is included in the second plurality of bits in the first loop breaker tag is set; and dropping, by the second networking device, the first loop breaker data frame.

20. The method of claim 15, further comprising:

receiving, by the first networking device and via the at least one first L2 domain connection, a second loop breaker data frame that includes a second loop breaker tag;

determining, by the first networking device, that the second loop breaker data frame is destined to egress out of the L2 domain via the edge connection;

generating, by the first networking device, a second data frame by removing the second loop breaker tag; and forwarding, by the first networking device and via the edge connection, the second data frame.

\* \* \* \* \*